US012016393B2

(12) United States Patent
Kaufman et al.

(10) Patent No.: US 12,016,393 B2
(45) Date of Patent: Jun. 25, 2024

(54) APPARATUS FOR HEATING SMOKABLE MATERIAL

(71) Applicant: NICOVENTURES TRADING LIMITED, London (GB)

(72) Inventors: Duane A. Kaufman, Hollandale, WI (US); Andrew P. Wilke, Madison, WI (US); Thomas P. Blandino, Cottage Grove, WI (US); James J. Frater, Madison, WI (US); Raymond J. Robey, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 17/930,474

(22) Filed: Sep. 8, 2022

(65) Prior Publication Data

US 2023/0000163 A1 Jan. 5, 2023

Related U.S. Application Data

(63) Continuation of application No. 15/772,382, filed as application No. PCT/EP2016/075734 on Oct. 26,
(Continued)

(51) Int. Cl.
*A24F 40/465* (2020.01)
*A24D 1/20* (2020.01)
(Continued)

(52) U.S. Cl.
CPC ........... *A24F 40/465* (2020.01); *H05B 6/105* (2013.01); *H05B 6/108* (2013.01); *H05B 6/365* (2013.01); *A24D 1/20* (2020.01); *A24F 40/20* (2020.01)

(58) Field of Classification Search
CPC ........ A24F 47/008; A24F 47/00; A24F 15/00; A24F 15/01; A24F 15/015; A24F 40/00;
(Continued)

(56) References Cited

U.S. PATENT DOCUMENTS 219,628 A 9/1879 Edison
219,634 A 9/1879 Gifford
(Continued)

FOREIGN PATENT DOCUMENTS

AT 262137 B 5/1968
AT 306224 B 3/1973
(Continued)

OTHER PUBLICATIONS

Application and File History for U.S. Appl. No. 14/428,626, filed Mar. 16, 2015, Inventors Hatrick et al.
(Continued)

*Primary Examiner* — Dana Ross
*Assistant Examiner* — Joe E Mills, Jr.
(74) *Attorney, Agent, or Firm* — Husch Blackwell LLP

(57) ABSTRACT

Disclosed is an apparatus for heating smokable material to volatilize at least one component of the smokable material. The apparatus includes a heating zone for receiving an article, and a magnetic field generator for generating a varying magnetic field that penetrates the heating zone. The article includes smokable material and heating material that is heatable by penetration with a varying magnetic field to heat the smokable material. The magnetic field generator includes a magnetically permeable core and a coil. The core includes a magnetically permeable first portion and magnetically permeable first and second arms extending from the first portion. The coil is wound around the first portion of the core. The first and second arms of the core are on different sides of the heating zone.

23 Claims, 2 Drawing Sheets

Related U.S. Application Data

2016, now Pat. No. 11,452,313, which is a continuation of application No. 14/927,529, filed on Oct. 30, 2015, now abandoned.

(51) Int. Cl.

*A24F 40/20* (2020.01)
*H05B 6/10* (2006.01)
*H05B 6/36* (2006.01)

(58) Field of Classification Search

CPC .......... A24F 40/05; A24F 40/10; A24F 40/20; A24F 40/30; A24F 40/40; A24F 40/42; A24F 40/44; A24F 40/46; A24F 40/465; A24F 40/48; A24F 40/485; A24F 40/49; A24F 40/50; A24F 40/51; A24F 40/57; A24F 40/60; A24F 40/65; A24F 40/70; A24F 40/80; A24F 40/08; A24F 40/90; A24F 40/95; H05B 6/105; H05B 6/108; H05B 6/365; H05B 3/36; H05B 6/40; A24D 3/17; A24D 1/22; A24C 5/01; B01F 15/06; B01F 13/08; B01F 13/001

USPC ....... 426/231, 241, 519; 310/82, 90.5, 12.01

See application file for complete search history.

(56) References Cited

U.S. PATENT DOCUMENTS 219,635 A 9/1879 Giles
219,643 A 9/1879 Mattoni
844,272 A 2/1907 Fate
912,986 A 2/1909 Aschenbrenner
1,071,817 A 9/1913 Stanley
1,771,366 A 7/1930 Wyss et al.
1,886,391 A 11/1932 Henri
2,057,353 A 10/1936 Whittemore, Jr.
2,104,266 A 1/1938 McCormick
2,462,563 A 2/1949 Seyforth
2,473,325 A 6/1949 Aufiero
2,689,150 A 9/1954 Croce
2,809,634 A 10/1957 Hirotada
2,888,208 A 5/1959 Rene et al.
3,040,991 A 6/1962 Rene et al.
3,043,524 A 7/1962 Sonia et al.
3,111,396 A 11/1963 Ball
3,144,174 A 8/1964 Henry et al.
3,225,954 A 12/1965 Herrick et al.
3,258,015 A 6/1966 Drummond et al.
3,265,236 A 8/1966 Norman et al.
3,289,949 A 12/1966 Willy et al.
3,347,231 A 10/1967 Chien-Hshuing et al.
3,402,724 A 9/1968 Blount et al.
3,431,393 A 3/1969 Katsuda
3,433,632 A 3/1969 Elbert et al.
3,521,643 A 7/1970 Toth
3,522,806 A 8/1970 Szekely et al.
3,604,428 A 9/1971 Moukaddem
3,647,143 A 3/1972 Gauthier et al.
3,658,059 A 4/1972 Steil
3,733,010 A 5/1973 Riccio
3,804,100 A 4/1974 Fariello
3,805,806 A 4/1974 Grihalva
3,856,185 A 12/1974 Riccio
3,864,326 A 2/1975 Babington
3,889,690 A 6/1975 Guarnieri
3,913,843 A 10/1975 Cambio, Jr. et al.
3,943,942 A 3/1976 Anderson et al.
3,964,902 A 6/1976 Fletcher et al.
4,009,713 A 3/1977 Simmons et al.
4,017,701 A 4/1977 Mittelmann
4,031,906 A 6/1977 Knapp
4,094,119 A 6/1978 Sullivan
4,145,001 A 3/1979 Weyenberg et al.
4,149,548 A 4/1979 Bradshaw
4,161,283 A 7/1979 Hyman
4,171,000 A 10/1979 Uhle
4,193,513 A 3/1980 Bull
4,284,089 A 8/1981 Ray
4,299,274 A 11/1981 Campbell
4,299,355 A 11/1981 Hakkinen
4,303,083 A 12/1981 Burruss
4,303,541 A 12/1981 Wasel-Nielen et al.
4,393,884 A 7/1983 Jacobs
4,412,930 A 11/1983 Koike et al.
4,427,123 A 1/1984 Komeda et al.
4,429,835 A 2/1984 Brugger et al.
4,474,191 A 10/1984 Steiner
4,503,851 A 3/1985 Braunroth
4,588,976 A 5/1986 Jaselli
4,628,187 A 12/1986 Sekiguchi et al.
4,638,820 A 1/1987 Roberts et al.
4,675,508 A 6/1987 Miyaji et al.
4,676,237 A 6/1987 Wood et al.
4,677,992 A 7/1987 Bliznak
4,694,841 A 9/1987 Esparza
4,734,097 A 3/1988 Tanabe et al.
4,735,217 A 4/1988 Gerth et al.
4,746,067 A 5/1988 Svoboda
4,756,318 A 7/1988 Clearman et al.
4,765,347 A 8/1988 Sensabaugh, Jr. et al.
4,765,348 A 8/1988 Honeycutt
4,771,795 A 9/1988 White et al.
4,776,353 A 10/1988 Lilja et al.
4,819,665 A 4/1989 Roberts et al.
4,827,950 A 5/1989 Banerjee et al.
4,830,028 A 5/1989 Lawson et al.
4,848,374 A 7/1989 Chard et al.
4,885,129 A 12/1989 Leonard et al.
4,892,109 A 1/1990 Strubel
4,907,606 A 3/1990 Lilja et al.
4,913,168 A 4/1990 Potter et al.
4,917,119 A 4/1990 Potter et al.
4,917,120 A 4/1990 Hill
4,917,301 A 4/1990 Munteanu
4,922,901 A 5/1990 Brooks et al.
4,924,883 A 5/1990 Perfetti et al.
4,938,236 A 7/1990 Banerjee et al.
4,941,483 A 7/1990 Ridings et al.
4,945,929 A 8/1990 Egilmex
4,945,931 A 8/1990 Gori
4,947,874 A 8/1990 Brooks et al.
4,947,875 A 8/1990 Brooks et al.
4,955,399 A 9/1990 Potter et al.
4,978,814 A 12/1990 Honour
4,979,521 A 12/1990 Davis et al.
4,987,291 A 1/1991 McGaffigan et al.
4,991,606 A 2/1991 Serrano et al.
5,019,122 A 5/1991 Clearman et al.
5,020,509 A 6/1991 Suzuki et al.
5,027,837 A 7/1991 Clearman et al.
5,040,551 A 8/1991 Schlatter et al.
5,040,552 A 8/1991 Schleich et al.
5,042,509 A 8/1991 Banerjee et al.
5,046,514 A 9/1991 Bolt
5,060,667 A 10/1991 Strubel
5,060,671 A 10/1991 Counts et al.
5,076,292 A 12/1991 Sensabaugh, Jr. et al.
5,080,115 A 1/1992 Templeton
5,093,894 A 3/1992 Deevi et al.
5,095,647 A 3/1992 Zobele et al.
5,095,921 A 3/1992 Losee et al.
5,096,921 A 3/1992 Bollinger et al.
5,097,850 A 3/1992 Braunshteyn et al.
5,099,861 A 3/1992 Clearman et al.
5,105,831 A 4/1992 Banerjee et al.
5,119,834 A 6/1992 Shannon et al.
5,121,881 A 6/1992 Lembeck
5,129,409 A 7/1992 White et al.
5,133,368 A 7/1992 Neumann et al.
5,143,048 A 9/1992 Cheney
5,144,962 A 9/1992 Counts et al.
5,146,934 A 9/1992 Deevi et al.

(56) References Cited

U.S. PATENT DOCUMENTS 5,159,940 A 11/1992 Hayward et al.
5,167,242 A 12/1992 Turner et al.
5,179,966 A 1/1993 Losee et al.
5,188,130 A 2/1993 Hajaligol et al.
5,190,060 A 3/1993 Gerding et al.
5,203,355 A 4/1993 Clearman et al.
5,224,498 A 7/1993 Deevi et al.
5,230,715 A 7/1993 Iizuna et al.
5,235,992 A 8/1993 Sensabaugh, Jr.
5,247,947 A 9/1993 Clearman et al.
5,249,586 A 10/1993 Morgan et al.
5,251,688 A 10/1993 Schatz
5,261,424 A 11/1993 Sprinkel, Jr.
5,269,327 A 12/1993 Counts et al.
5,271,980 A 12/1993 Bell
5,272,216 A 12/1993 Clark, Jr. et al.
5,285,798 A 2/1994 Banerjee et al.
5,293,883 A 3/1994 Edwards
5,303,720 A 4/1994 Banerjee et al.
5,305,733 A 4/1994 Walters
5,312,046 A 5/1994 Knoch et al.
5,322,075 A 6/1994 Deevi et al.
5,327,915 A 7/1994 Porenski et al.
5,331,979 A 7/1994 Henley
5,345,951 A 9/1994 Serrano et al.
5,353,813 A 10/1994 Deevi et al.
5,357,984 A 10/1994 Farrier et al.
5,369,723 A 11/1994 Counts et al.
5,372,148 A 12/1994 McCafferty et al.
5,388,574 A 2/1995 Ingebrethsen
5,388,594 A 2/1995 Counts et al.
5,390,864 A 2/1995 Alexander
5,396,911 A 3/1995 Casey, III et al.
5,400,808 A 3/1995 Turner et al.
5,402,803 A 4/1995 Takagi
5,408,574 A 4/1995 Deevi et al.
5,412,183 A 5/1995 Buffenoir et al.
5,415,186 A 5/1995 Casey, III et al.
5,434,388 A 7/1995 Kralik et al.
5,443,560 A 8/1995 Deevi et al.
5,454,363 A 10/1995 Sata
5,461,695 A 10/1995 Knoch
5,468,936 A 11/1995 Deevi et al.
5,474,059 A 12/1995 Cooper
5,479,948 A 1/1996 Counts et al.
5,483,953 A 1/1996 Cooper
5,497,792 A 3/1996 Prasad et al.
5,499,636 A 3/1996 Baggett, Jr. et al.
5,500,511 A 3/1996 Hansen et al.
5,501,236 A 3/1996 Hill et al.
5,502,743 A 3/1996 Conochie et al.
5,505,214 A 4/1996 Collins et al.
5,511,538 A 4/1996 Haber et al.
5,517,981 A 5/1996 Taub et al.
5,530,225 A 6/1996 Hajaligol
5,534,020 A 7/1996 Cheney, III et al.
5,538,020 A 7/1996 Farrier et al.
5,540,241 A 7/1996 Kim
5,549,906 A 8/1996 Santus
5,553,791 A 9/1996 Alexander
5,564,442 A 10/1996 Macdonald et al.
5,573,140 A 11/1996 Satomi et al.
5,573,692 A 11/1996 Das et al.
5,591,368 A 1/1997 Fleischhauer et al.
5,593,792 A 1/1997 Farrier et al.
5,613,504 A 3/1997 Collins et al.
5,613,505 A 3/1997 Campbell et al.
5,636,787 A 6/1997 Gowhari
5,645,749 A 7/1997 Wang
5,649,554 A 7/1997 Sprinkel et al.
5,659,656 A 8/1997 Das
5,665,262 A 9/1997 Hajaligol et al.
5,666,977 A 9/1997 Higgins et al.
5,687,912 A 11/1997 Denyer
5,692,291 A 12/1997 Deevi et al.
5,699,786 A 12/1997 Oshima et al.
5,711,292 A 1/1998 Hammarlund
5,726,421 A 3/1998 Fleischhauer et al.
5,736,110 A 4/1998 Angelillo et al.
5,742,251 A 4/1998 Gerber
5,743,251 A 4/1998 Howell et al.
5,771,845 A 6/1998 Pistien et al.
5,778,899 A 7/1998 Saito et al.
5,798,154 A 8/1998 Bryan
5,808,281 A * 9/1998 Matsen ................ B29C 70/506
219/645
5,837,088 A 11/1998 Palmgren et al.
5,845,649 A 12/1998 Saito et al.
5,865,185 A 2/1999 Collins et al.
5,865,186 A 2/1999 Volsey, II
5,878,752 A 3/1999 Adams et al.
5,902,501 A 5/1999 Nunnally et al.
5,921,233 A 7/1999 Gold et al.
5,935,486 A 8/1999 Bell et al.
5,938,125 A 8/1999 Ritsche et al.
5,958,273 A 9/1999 Koch et al.
5,984,953 A 11/1999 Sabin et al.
6,000,394 A 12/1999 Blaha-Schnabel et al.
6,026,820 A 2/2000 Baggett, Jr. et al.
6,037,568 A 3/2000 Hatanaka et al.
6,040,560 A 3/2000 Fleischhauer et al.
6,041,790 A 3/2000 Smith et al.
6,053,176 A 4/2000 Adams et al.
6,058,711 A 5/2000 Maciaszek et al.
6,079,405 A 6/2000 Justo
6,085,741 A 7/2000 Becker
6,089,857 A 7/2000 Matsuura et al.
6,095,505 A 8/2000 Miller
6,113,078 A 9/2000 Rock
6,116,231 A 9/2000 Sabin et al.
6,125,853 A 10/2000 Susa et al.
6,129,080 A 10/2000 Pitcher et al.
6,155,268 A 12/2000 Takeuchi
6,158,676 A 12/2000 Hughes
6,164,287 A 12/2000 White
6,178,963 B1 1/2001 Baik
6,209,457 B1 4/2001 Kenworthy et al.
6,223,745 B1 5/2001 Hammarlund et al.
6,224,179 B1 5/2001 Wenning et al.
6,230,703 B1 5/2001 Bono
6,234,459 B1 5/2001 Rock
6,244,573 B1 6/2001 Rock
6,248,257 B1 6/2001 Bell et al.
6,267,110 B1 7/2001 Tenenboum et al.
6,275,650 B1 8/2001 Lambert
6,283,116 B1 9/2001 Yang
6,289,889 B1 9/2001 Bell et al.
6,297,483 B2 10/2001 Sadahira et al.
6,315,366 B1 11/2001 Post et al.
6,347,789 B1 2/2002 Rock
6,376,816 B2 4/2002 Cooper et al.
6,427,878 B1 8/2002 Greiner-Perth et al.
6,595,209 B1 7/2003 Rose et al.
6,598,607 B2 7/2003 Adiga et al.
6,644,383 B2 11/2003 Joseph et al.
6,648,306 B2 11/2003 Rock
6,652,804 B1 11/2003 Neumann et al.
6,669,176 B2 12/2003 Rock
6,681,998 B2 1/2004 Sharpe et al.
6,701,921 B2 3/2004 Sprinkel et al.
6,708,846 B1 3/2004 Fuchs et al.
6,723,115 B1 4/2004 Daly
6,761,164 B2 7/2004 Amirpour et al.
6,769,436 B2 8/2004 Horian
6,790,496 B1 9/2004 Levander et al.
6,799,572 B2 10/2004 Nichols et al.
6,803,545 B2 10/2004 Blake et al.
6,803,550 B2 10/2004 Sharpe et al.
6,827,080 B2 12/2004 Fish et al.
6,868,230 B2 3/2005 Gerhardinger
6,886,556 B2 5/2005 Fuchs
6,953,474 B2 10/2005 Lu
6,968,888 B2 11/2005 Kolowich
6,994,096 B2 2/2006 Rostami et al.

(56) References Cited

U.S. PATENT DOCUMENTS

| | | | |
|---|---|---|---|
| 7,012,227 | B2 | 3/2006 | Tathgur et al. |
| 7,041,123 | B2 | 5/2006 | Stapf et al. |
| 7,077,130 | B2 | 7/2006 | Nichols et al. |
| 7,081,211 | B2 | 7/2006 | Li et al. |
| 7,088,914 | B2 | 8/2006 | Whittle et al. |
| 7,100,618 | B2 | 9/2006 | Dominguez |
| 7,112,712 | B1 | 9/2006 | Ancell |
| 7,163,014 | B2 | 1/2007 | Nichols et al. |
| 7,185,659 | B2 | 3/2007 | Sharpe |
| 7,234,459 | B2 | 6/2007 | Del Bon |
| 7,235,187 | B2 | 6/2007 | Li et al. |
| 7,263,282 | B2 | 8/2007 | Meyer |
| 7,290,549 | B2 | 11/2007 | Banerjee et al. |
| 7,303,328 | B2 | 12/2007 | Faraldi et al. |
| 7,335,186 | B2 | 2/2008 | O'Neil |
| 7,373,938 | B2 | 5/2008 | Nichols et al. |
| 7,374,063 | B2 | 5/2008 | Reid |
| 7,400,940 | B2 | 7/2008 | McRae et al. |
| 7,434,584 | B2 | 10/2008 | Steinberg |
| 7,458,374 | B2 | 12/2008 | Hale et al. |
| 7,540,286 | B2 | 6/2009 | Cross et al. |
| 7,581,540 | B2 | 9/2009 | Hale et al. |
| 7,581,718 | B1 | 9/2009 | Chang |
| 7,585,493 | B2 | 9/2009 | Hale et al. |
| 7,624,739 | B2 | 12/2009 | Snaidr et al. |
| 7,645,442 | B2 | 1/2010 | Hale et al. |
| 7,665,461 | B2 | 2/2010 | Zierenberg et al. |
| 7,726,320 | B2 | 6/2010 | Robinson et al. |
| 7,767,698 | B2 | 8/2010 | Warchol et al. |
| 7,832,397 | B2 | 11/2010 | Lipowicz |
| 7,832,410 | B2 | 11/2010 | Hon |
| 7,834,295 | B2 | 11/2010 | Sharma et al. |
| 7,913,688 | B2 | 3/2011 | Cross et al. |
| 7,987,846 | B2 | 8/2011 | Hale et al. |
| 7,992,554 | B2 | 8/2011 | Radomski et al. |
| 8,061,361 | B2 | 11/2011 | Maeder et al. |
| 8,079,371 | B2 | 12/2011 | Robinson et al. |
| 8,081,474 | B1 | 12/2011 | Zohni et al. |
| 8,118,021 | B2 | 2/2012 | Cho et al. |
| 8,156,944 | B2 | 4/2012 | Han |
| 8,342,184 | B2 | 1/2013 | Inagaki et al. |
| 8,365,742 | B2 | 2/2013 | Hon |
| 8,375,957 | B2 | 2/2013 | Hon |
| 8,393,331 | B2 | 3/2013 | Hon |
| 8,402,976 | B2 | 3/2013 | Fernando et al. |
| 8,430,106 | B2 | 4/2013 | Potter et al. |
| 8,439,046 | B2 | 5/2013 | Peters et al. |
| 8,459,271 | B2 | 6/2013 | Inagaki |
| 8,490,628 | B2 | 7/2013 | Hon |
| 8,511,318 | B2 | 8/2013 | Hon |
| 8,678,013 | B2 | 3/2014 | Crooks et al. |
| 8,689,804 | B2 | 4/2014 | Fernando et al. |
| 8,689,805 | B2 | 4/2014 | Hon |
| 8,701,682 | B2 | 4/2014 | Sherwood et al. |
| 8,707,967 | B2 | 4/2014 | Li et al. |
| 8,752,545 | B2 | 6/2014 | Buchberger |
| 8,757,404 | B1 | 6/2014 | Fleckenstein |
| 8,807,140 | B1 | 8/2014 | Scatterday |
| 8,833,364 | B2 | 9/2014 | Buchberger |
| 8,899,238 | B2 | 12/2014 | Robinson et al. |
| 8,948,578 | B2 | 2/2015 | Buchberger |
| 9,060,388 | B2 | 6/2015 | Liu |
| 9,084,440 | B2 | 7/2015 | Zuber et al. |
| 9,125,437 | B2 | 9/2015 | Kaljura |
| 9,302,522 | B2 | 4/2016 | Sherwood et al. |
| 9,357,803 | B2 | 6/2016 | Egoyants et al. |
| 9,414,619 | B2 | 8/2016 | Sizer et al. |
| 9,414,629 | B2 | 8/2016 | Egoyants et al. |
| 9,439,454 | B2 | 9/2016 | Fernando et al. |
| 9,554,598 | B2 | 1/2017 | Egoyants et al. |
| 9,609,894 | B2 | 4/2017 | Abramov et al. |
| 9,623,205 | B2 | 4/2017 | Buchberger |
| 9,668,516 | B2 | 6/2017 | Sherwood et al. |
| 9,693,587 | B2 | 7/2017 | Plojoux et al. |
| 9,955,726 | B2 | 5/2018 | Brinkley et al. |
| 9,980,523 | B2 | 5/2018 | Abramov et al. |
| 9,999,256 | B2 | 6/2018 | Abramov et al. |
| 10,010,695 | B2 | 7/2018 | Buchberger |
| 10,045,562 | B2 | 8/2018 | Buchberger |
| 10,130,121 | B2 | 11/2018 | Plojoux et al. |
| 10,130,780 | B2 | 11/2018 | Talon |
| 10,524,516 | B2 | 1/2020 | Alelov |
| 10,588,337 | B2 | 3/2020 | Prestia et al. |
| 10,881,138 | B2 | 1/2021 | Saleem et al. |
| 10,881,141 | B2 | 1/2021 | Fraser et al. |
| 2001/0042546 | A1 | 11/2001 | Umeda et al. |
| 2001/0042927 | A1 | 11/2001 | Rock |
| 2001/0045424 | A1 | 11/2001 | Cooper |
| 2001/0054421 | A1 | 12/2001 | Jaser et al. |
| 2002/0005207 | A1 | 1/2002 | Wrenn et al. |
| 2002/0016370 | A1 | 2/2002 | Shytle et al. |
| 2002/0043260 | A1 | 4/2002 | Layer et al. |
| 2002/0078951 | A1 | 6/2002 | Nichols et al. |
| 2002/0078955 | A1 | 6/2002 | Nichols et al. |
| 2002/0078956 | A1 | 6/2002 | Sharpe et al. |
| 2002/0079309 | A1 | 6/2002 | Cox et al. |
| 2002/0079377 | A1 | 6/2002 | Nichols |
| 2002/0089072 | A1 | 7/2002 | Rock |
| 2002/0121624 | A1 | 9/2002 | Usui |
| 2002/0170666 | A1 | 11/2002 | Tathgur et al. |
| 2003/0005620 | A1 | 1/2003 | Ananth et al. |
| 2003/0007887 | A1 | 1/2003 | Roumpos et al. |
| 2003/0049025 | A1 | 3/2003 | Neumann et al. |
| 2003/0052196 | A1 | 3/2003 | Fuchs |
| 2003/0079309 | A1 | 5/2003 | Vandenbelt et al. |
| 2003/0097164 | A1 | 5/2003 | Stapf et al. |
| 2003/0101984 | A1 | 6/2003 | Li et al. |
| 2003/0105192 | A1 | 6/2003 | Li et al. |
| 2003/0106551 | A1 | 6/2003 | Sprinkel, Jr. et al. |
| 2003/0106552 | A1 | 6/2003 | Sprinkel et al. |
| 2003/0108342 | A1 | 6/2003 | Sherwood et al. |
| 2003/0111637 | A1 | 6/2003 | Li et al. |
| 2003/0146224 | A1 | 8/2003 | Fujii et al. |
| 2003/0159702 | A1 | 8/2003 | Lindell et al. |
| 2003/0200964 | A1 | 10/2003 | Blakley et al. |
| 2003/0202169 | A1 | 10/2003 | Liu |
| 2003/0209240 | A1 | 11/2003 | Hale et al. |
| 2003/0217750 | A1 | 11/2003 | Amirpour et al. |
| 2003/0226837 | A1 | 12/2003 | Blake et al. |
| 2003/0230567 | A1 | 12/2003 | Centanni et al. |
| 2004/0003820 | A1 | 1/2004 | Iannuzzi |
| 2004/0031485 | A1 | 2/2004 | Rustad et al. |
| 2004/0031495 | A1 | 2/2004 | Steinberg |
| 2004/0065314 | A1 | 4/2004 | Layer et al. |
| 2004/0068222 | A1 | 4/2004 | Brian |
| 2004/0083755 | A1 | 5/2004 | Kolowich |
| 2004/0096204 | A1 | 5/2004 | Gerhardinger |
| 2004/0129793 | A1 | 7/2004 | Nguyen et al. |
| 2004/0149296 | A1 | 8/2004 | Rostami et al. |
| 2004/0149297 | A1 | 8/2004 | Sharpe |
| 2004/0149737 | A1 | 8/2004 | Sharpe et al. |
| 2004/0177849 | A1 | 9/2004 | Del Bon |
| 2004/0210151 | A1 | 10/2004 | Tsukashima et al. |
| 2004/0226568 | A1 | 11/2004 | Takeuchi et al. |
| 2004/0234699 | A1 | 11/2004 | Hale et al. |
| 2004/0234914 | A1 | 11/2004 | Hale et al. |
| 2004/0234916 | A1 | 11/2004 | Hale et al. |
| 2004/0255941 | A1 | 12/2004 | Nichols et al. |
| 2004/0261782 | A1 | 12/2004 | Furumichi et al. |
| 2005/0007870 | A1 | 1/2005 | Faraldi et al. |
| 2005/0016549 | A1 | 1/2005 | Banerjee et al. |
| 2005/0025213 | A1 | 2/2005 | Parks |
| 2005/0031798 | A1 | 2/2005 | Tathgur et al. |
| 2005/0045193 | A1 | 3/2005 | Yang |
| 2005/0063686 | A1 | 3/2005 | Whittle et al. |
| 2005/0066735 | A1 | 3/2005 | Beavis et al. |
| 2005/0079166 | A1 | 4/2005 | Damani et al. |
| 2005/0098187 | A1 | 5/2005 | Grierson et al. |
| 2005/0133029 | A1 | 6/2005 | Nichols et al. |
| 2005/0145260 | A1 | 7/2005 | Inagaki et al. |
| 2005/0194013 | A1 | 9/2005 | Wright |
| 2005/0196345 | A1 | 9/2005 | Diederichs et al. |
| 2005/0204799 | A1 | 9/2005 | Koch |
| 2005/0211711 | A1 | 9/2005 | Reid |

(56) References Cited

U.S. PATENT DOCUMENTS

2005/0236006 A1 10/2005 Cowan
2005/0268911 A1 12/2005 Cross et al.
2006/0027233 A1 2/2006 Zierenberg et al.
2006/0032501 A1 2/2006 Hale et al.
2006/0043067 A1 3/2006 Kadkhodayan et al.
2006/0078477 A1 4/2006 Althouse et al.
2006/0102175 A1 5/2006 Nelson
2006/0118128 A1 6/2006 Hoffmann et al.
2006/0137681 A1 6/2006 Von Hollen et al.
2006/0191546 A1 8/2006 Takano et al.
2006/0196518 A1 9/2006 Hon
2006/0196885 A1 9/2006 Leach et al.
2006/0255029 A1 11/2006 Bone, Jr.
2007/0014549 A1 1/2007 Demarest et al.
2007/0023043 A1 2/2007 Von Hollen et al.
2007/0028916 A1 2/2007 Hale et al.
2007/0031340 A1 2/2007 Hale et al.
2007/0045288 A1 3/2007 Nelson
2007/0062548 A1 3/2007 Horstmann et al.
2007/0074734 A1 4/2007 Braunshteyn et al.
2007/0102013 A1 5/2007 Adams et al.
2007/0102533 A1 5/2007 Rosell et al.
2007/0107879 A1 5/2007 Radomski et al.
2007/0125362 A1 6/2007 Ford et al.
2007/0131219 A1 6/2007 Ford et al.
2007/0138207 A1 6/2007 Bonney et al.
2007/0155255 A1 7/2007 Galauner et al.
2007/0175476 A1 8/2007 Lipowicz
2007/0204858 A1 9/2007 Abelbeck
2007/0204864 A1 9/2007 Grychowski et al.
2007/0204868 A1 9/2007 Bollinger et al.
2007/0222112 A1 9/2007 Christ et al.
2007/0235046 A1 10/2007 Gedevanishvili
2007/0267407 A1 11/2007 Loveless et al.
2007/0279377 A1 12/2007 Hillis et al.
2007/0283972 A1 12/2007 Monsees et al.
2007/0289720 A1 12/2007 Sunol et al.
2008/0027694 A1 1/2008 Gitman
2008/0031267 A1 2/2008 Imao
2008/0038363 A1 2/2008 Zaffaroni et al.
2008/0085139 A1 4/2008 Roof
2008/0092912 A1 4/2008 Robinson et al.
2008/0149118 A1 6/2008 Oglesby et al.
2008/0149622 A1 6/2008 Weiss et al.
2008/0156326 A1 7/2008 Belcastro et al.
2008/0216828 A1 9/2008 Wensley et al.
2008/0233318 A1 9/2008 Coyle
2008/0241255 A1 10/2008 Rose et al.
2008/0257367 A1 10/2008 Paterno et al.
2008/0276947 A1 11/2008 Martzel
2008/0302374 A1 12/2008 Wengert et al.
2008/0312674 A1 12/2008 Chen et al.
2009/0015717 A1 1/2009 Arnao et al.
2009/0032034 A1 2/2009 Steinberg
2009/0056728 A1 3/2009 Baker
2009/0065011 A1 3/2009 Maeder et al.
2009/0071477 A1 3/2009 Hale et al.
2009/0078711 A1 3/2009 Farone et al.
2009/0090349 A1 4/2009 Donovan
2009/0090351 A1 4/2009 Sunol et al.
2009/0090472 A1 4/2009 Radomski
2009/0095287 A1 4/2009 Emarlou
2009/0095311 A1 4/2009 Han
2009/0107492 A1 4/2009 Ooida
2009/0114215 A1 5/2009 Boeck et al.
2009/0126745 A1 5/2009 Hon
2009/0127253 A1 5/2009 Stark et al.
2009/0151717 A1 6/2009 Bowen et al.
2009/0162294 A1 6/2009 Werner
2009/0180968 A1 7/2009 Hale et al.
2009/0188490 A1 7/2009 Han
2009/0199843 A1 8/2009 Farone et al.
2009/0217923 A1 9/2009 Boehm et al.
2009/0230117 A1 9/2009 Fernando et al.
2009/0241947 A1 10/2009 Bedini et al.
2009/0255923 A1 10/2009 Buehrer et al.
2009/0260641 A1 10/2009 Monsees et al.
2009/0260642 A1 10/2009 Monsees et al.
2009/0272379 A1 11/2009 Thorens et al.
2009/0280043 A1 11/2009 Ferguson
2009/0293892 A1 12/2009 Williams et al.
2009/0301363 A1 12/2009 Damani et al.
2009/0301471 A1 12/2009 Stirzel
2009/0302019 A1 12/2009 Selenski et al.
2009/0304372 A1 12/2009 Gubler et al.
2010/0006092 A1 1/2010 Hale et al.
2010/0025023 A1 2/2010 Schmidt et al.
2010/0031968 A1 2/2010 Sheikh et al.
2010/0043809 A1 2/2010 Magnon
2010/0059070 A1 3/2010 Potter et al.
2010/0065052 A1 3/2010 Sharma et al.
2010/0065653 A1 3/2010 Wingo et al.
2010/0068154 A1 3/2010 Sharma et al.
2010/0083959 A1 4/2010 Siller
2010/0089381 A1 4/2010 Bolmer et al.
2010/0108059 A1 5/2010 Axelsson et al.
2010/0126516 A1 5/2010 Yomtov et al.
2010/0147299 A1 6/2010 Row et al.
2010/0181387 A1 7/2010 Zaffaroni et al.
2010/0200006 A1 8/2010 Robinson et al.
2010/0236546 A1 9/2010 Yamada et al.
2010/0242974 A1 9/2010 Pan
2010/0242975 A1 9/2010 Hearn
2010/0258585 A1 10/2010 Jamison
2010/0268212 A1 10/2010 Manwaring et al.
2010/0300467 A1 12/2010 Kuistila et al.
2010/0307518 A1 12/2010 Wang
2010/0313901 A1 12/2010 Fernando et al.
2011/0005535 A1 1/2011 Xiu
2011/0011396 A1 1/2011 Fang
2011/0030671 A1 2/2011 Ferguson et al.
2011/0036363 A1 2/2011 Urtsev et al.
2011/0090266 A1 4/2011 King et al.
2011/0094523 A1 4/2011 Thorens et al.
2011/0120989 A1 5/2011 Schilling et al.
2011/0126848 A1 6/2011 Zuber et al.
2011/0155153 A1 6/2011 Thorens et al.
2011/0155718 A1 6/2011 Greim et al.
2011/0192408 A1 8/2011 Inagaki et al.
2011/0192914 A1 8/2011 Ishigami
2011/0226236 A1 9/2011 Buchberger
2011/0240022 A1 10/2011 Hodges et al.
2011/0264084 A1 10/2011 Reid
2011/0277757 A1 11/2011 Terry et al.
2011/0283458 A1 11/2011 Gillette et al.
2011/0290266 A1 12/2011 Koller
2011/0290267 A1 12/2011 Yamada et al.
2011/0297166 A1 12/2011 Takeuchi et al.
2011/0303230 A1 12/2011 Thiry
2011/0303231 A1 12/2011 Li et al.
2012/0006342 A1 1/2012 Rose et al.
2012/0006343 A1 1/2012 Renaud et al.
2012/0132196 A1 5/2012 Vladyslavovych
2012/0145169 A1 6/2012 Wu
2012/0145189 A1 6/2012 Knopow et al.
2012/0234315 A1 9/2012 Li et al.
2012/0234821 A1 9/2012 Shimizu
2012/0255546 A1 10/2012 Goetz et al.
2012/0260927 A1 10/2012 Liu
2012/0285476 A1 11/2012 Hon
2013/0042865 A1 2/2013 Monsees et al.
2013/0061861 A1 3/2013 Hearn
2013/0074857 A1 3/2013 Buchberger
2013/0081623 A1 4/2013 Buchberger
2013/0087160 A1 4/2013 Gherghe
2013/0133675 A1 5/2013 Shinozaki et al.
2013/0142782 A1 6/2013 Rahmel et al.
2013/0152922 A1 6/2013 Benassayag et al.
2013/0192615 A1 8/2013 Tucker et al.
2013/0213419 A1 8/2013 Tucker et al.
2013/0284192 A1 10/2013 Peleg et al.
2013/0306084 A1 11/2013 Flick
2013/0333700 A1 12/2013 Buchberger
2013/0340779 A1 12/2013 Liu

(56) References Cited

U.S. PATENT DOCUMENTS

| | | | |
|---|---|---|---|
| 2014/0000638 | A1 | 1/2014 | Sebastian et al. |
| 2014/0060528 | A1 | 3/2014 | Liu |
| 2014/0060554 | A1 | 3/2014 | Collett et al. |
| 2014/0060555 | A1 | 3/2014 | Chang et al. |
| 2014/0096781 | A1 | 4/2014 | Sears et al. |
| 2014/0182608 | A1 | 7/2014 | Egoyants et al. |
| 2014/0182843 | A1 | 7/2014 | Vinegar |
| 2014/0196716 | A1 | 7/2014 | Liu |
| 2014/0202454 | A1 | 7/2014 | Buchberger |
| 2014/0202476 | A1 | 7/2014 | Egoyants et al. |
| 2014/0209105 | A1 | 7/2014 | Sears et al. |
| 2014/0216482 | A1 | 8/2014 | Dotan et al. |
| 2014/0216485 | A1 | 8/2014 | Egoyants et al. |
| 2014/0238396 | A1 | 8/2014 | Buchberger |
| 2014/0238423 | A1 | 8/2014 | Tucker et al. |
| 2014/0238424 | A1 | 8/2014 | Macko et al. |
| 2014/0238737 | A1 | 8/2014 | Backman |
| 2014/0261490 | A1 | 9/2014 | Kane |
| 2014/0270726 | A1 | 9/2014 | Egoyants et al. |
| 2014/0270730 | A1 | 9/2014 | Depiano et al. |
| 2014/0283825 | A1 | 9/2014 | Buchberger |
| 2014/0286630 | A1 | 9/2014 | Buchberger |
| 2014/0299125 | A1 | 10/2014 | Buchberger |
| 2014/0305449 | A1 | 10/2014 | Plojoux et al. |
| 2014/0326257 | A1 | 11/2014 | Jalloul et al. |
| 2014/0334802 | A1 | 11/2014 | Dubief |
| 2014/0338680 | A1 | 11/2014 | Abramov et al. |
| 2014/0360515 | A1 | 12/2014 | Vasiliev et al. |
| 2015/0020825 | A1 | 1/2015 | Galloway et al. |
| 2015/0040925 | A1 | 2/2015 | Saleem et al. |
| 2015/0114406 | A1 | 4/2015 | Newton |
| 2015/0114411 | A1 | 4/2015 | Buchberger |
| 2015/0142088 | A1 | 5/2015 | Riva Godoy |
| 2015/0157055 | A1 | 6/2015 | Lord |
| 2015/0157756 | A1 | 6/2015 | Duffield et al. |
| 2015/0196058 | A1 | 7/2015 | Lord |
| 2015/0208728 | A1 | 7/2015 | Lord |
| 2015/0223292 | A1 | 8/2015 | Duffield et al. |
| 2015/0223520 | A1 | 8/2015 | Phillips et al. |
| 2015/0245669 | A1 | 9/2015 | Cadieux et al. |
| 2015/0272219 | A1 | 10/2015 | Hatrick et al. |
| 2015/0282256 | A1 | 10/2015 | Iguro et al. |
| 2015/0302971 | A1 | 10/2015 | Wagman et al. |
| 2015/0320116 | A1 | 11/2015 | Bleloch et al. |
| 2016/0003403 | A1 | 1/2016 | Smith |
| 2016/0036222 | A1 | 2/2016 | Templeton et al. |
| 2016/0044963 | A1 | 2/2016 | Saleem |
| 2016/0073693 | A1 | 3/2016 | Reevell |
| 2016/0088685 | A1 | 3/2016 | Henke et al. |
| 2016/0106154 | A1 | 4/2016 | Lord |
| 2016/0106155 | A1 | 4/2016 | Reevell |
| 2016/0146506 | A1 | 5/2016 | Brereton et al. |
| 2016/0150825 | A1 | 6/2016 | Mironov et al. |
| 2016/0150828 | A1 | 6/2016 | Goldstein et al. |
| 2016/0168438 | A1 | 6/2016 | Harding et al. |
| 2016/0248280 | A1 | 8/2016 | Ben-Shalom et al. |
| 2016/0255879 | A1 | 9/2016 | Paprocki et al. |
| 2016/0295921 | A1 | 10/2016 | Mironov et al. |
| 2017/0006916 | A1 | 1/2017 | Liu |
| 2017/0042245 | A1 | 2/2017 | Buchberger et al. |
| 2017/0055574 | A1 | 3/2017 | Kaufman et al. |
| 2017/0055575 | A1 | 3/2017 | Wilke et al. |
| 2017/0055580 | A1 | 3/2017 | Blandino et al. |
| 2017/0055581 | A1 | 3/2017 | Wilke et al. |
| 2017/0055582 | A1 | 3/2017 | Blandino et al. |
| 2017/0055583 | A1 | 3/2017 | Blandino et al. |
| 2017/0055584 | A1 | 3/2017 | Blandino et al. |
| 2017/0071250 | A1 | 3/2017 | Mironov et al. |
| 2017/0079325 | A1 | 3/2017 | Mironov |
| 2017/0086508 | A1 | 3/2017 | Mironov et al. |
| 2017/0095006 | A1 | 4/2017 | Egoyants et al. |
| 2017/0119046 | A1 | 5/2017 | Kaufman et al. |
| 2017/0119047 | A1 | 5/2017 | Blandino et al. |
| 2017/0119048 | A1 | 5/2017 | Kaufman et al. |
| 2017/0119049 | A1 | 5/2017 | Blandino et al. |
| 2017/0119050 | A1 | 5/2017 | Blandino et al. |
| 2017/0119051 | A1 | 5/2017 | Blandino et al. |
| 2017/0119054 | A1 | 5/2017 | Zinovik et al. |
| 2017/0156403 | A1 | 6/2017 | Gill et al. |
| 2017/0156406 | A1 | 6/2017 | Abramov et al. |
| 2017/0156407 | A1 | 6/2017 | Abramov et al. |
| 2017/0197043 | A1 | 7/2017 | Buchberger |
| 2017/0197044 | A1 | 7/2017 | Buchberger |
| 2017/0197046 | A1 | 7/2017 | Buchberger |
| 2017/0197048 | A1 | 7/2017 | Khosrowshahi et al. |
| 2017/0197049 | A1 | 7/2017 | Doll |
| 2017/0197050 | A1 | 7/2017 | Reinburg et al. |
| 2017/0231281 | A1 | 8/2017 | Hatton et al. |
| 2017/0303585 | A1 | 10/2017 | Florack et al. |
| 2017/0332700 | A1 | 11/2017 | Plews et al. |
| 2017/0340008 | A1 | 11/2017 | Sebastian et al. |
| 2018/0184713 | A1 | 7/2018 | Mironov et al. |
| 2018/0192700 | A1 | 7/2018 | Fraser et al. |
| 2018/0214645 | A1 | 8/2018 | Reevell |
| 2018/0235279 | A1 | 8/2018 | Wilke et al. |
| 2018/0242633 | A1 | 8/2018 | Wilke et al. |
| 2018/0242636 | A1 | 8/2018 | Blandino et al. |
| 2018/0249760 | A1 | 9/2018 | Kaufman et al. |
| 2018/0271171 | A1 | 9/2018 | Abramov et al. |
| 2018/0279677 | A1 | 10/2018 | Blandino et al. |
| 2018/0317552 | A1 | 11/2018 | Kaufman et al. |
| 2018/0317553 | A1 | 11/2018 | Blandino et al. |
| 2018/0317554 | A1 | 11/2018 | Kaufman et al. |
| 2018/0317555 | A1 | 11/2018 | Blandino et al. |
| 2018/0325173 | A1 | 11/2018 | Blandino et al. |
| 2019/0000142 | A1 | 1/2019 | Lavanchy et al. |
| 2019/0014820 | A1 | 1/2019 | Malgat |
| 2019/0082738 | A1 | 3/2019 | Blandino et al. |
| 2019/0191780 | A1 | 6/2019 | Wilke et al. |
| 2019/0230988 | A1 | 8/2019 | Aoun |
| 2019/0239555 | A1 | 8/2019 | Nicholson |
| 2019/0313695 | A1 | 10/2019 | Kaufman et al. |
| 2019/0364973 | A1 | 12/2019 | Kaufman et al. |
| 2020/0054068 | A1 | 2/2020 | Blandino et al. |
| 2020/0054069 | A1 | 2/2020 | Blandino et al. |
| 2020/0229497 | A1 | 7/2020 | Aoun et al. |
| 2020/0268053 | A1 | 8/2020 | Thorsen et al. |
| 2020/0288774 | A1 | 9/2020 | Blandino et al. |
| 2020/0352237 | A1 | 11/2020 | Kaufman et al. |
| 2021/0093008 | A1 | 4/2021 | White et al. |
| 2021/0093012 | A1 | 4/2021 | White et al. |
| 2021/0137167 | A1 | 5/2021 | Aoun et al. |
| 2021/0186109 | A1 | 6/2021 | Milligan et al. |

FOREIGN PATENT DOCUMENTS

| | | | |
|---|---|---|---|
| AT | 321190 | B | 3/1975 |
| AT | 321191 | B | 3/1975 |
| AT | 507187 | B1 | 3/2010 |
| AT | 508244 | A4 | 12/2010 |
| AT | 510405 | A4 | 4/2012 |
| AT | 510504 | A1 | 4/2012 |
| AU | 6393173 | A | 6/1975 |
| AU | 2002364521 | A1 | 6/2003 |
| AU | 2018241908 | B2 | 9/2020 |
| AU | 2020281092 | A1 | 1/2021 |
| CA | 2160990 | A1 | 10/1994 |
| CA | 2146954 | A1 | 10/1996 |
| CA | 2309376 | A1 | 11/2000 |
| CA | 2414161 | A1 | 1/2002 |
| CA | 2414191 | A1 | 1/2002 |
| CA | 2520759 | A1 | 10/2004 |
| CA | 2492255 | A1 | 7/2006 |
| CA | 2668465 | A1 | 12/2009 |
| CA | 2712412 | A1 | 12/2009 |
| CA | 2641869 | A1 | 5/2010 |
| CA | 2862048 | A1 | 7/2013 |
| CA | 2923377 | A1 | 6/2015 |
| CA | 2989375 | A1 | 1/2017 |
| CH | 513656 | A | 10/1971 |
| CH | 698603 | B1 | 9/2009 |
| CL | 199400288 | A1 | 8/1995 |
| CL | 2007002226 | A1 | 2/2008 |
| CL | 2013003637 | A1 | 7/2014 |

(56) References Cited

FOREIGN PATENT DOCUMENTS

| | | | |
|---|---|---|---|
| CL | 2014002840 | A1 | 12/2014 |
| CL | 2017003408 | A1 | 6/2018 |
| CN | 86102917 | A | 11/1987 |
| CN | 1038085 | A | 12/1989 |
| CN | 1040914 | A | 4/1990 |
| CN | 1043076 | A | 6/1990 |
| CN | 1045691 | A | 10/1990 |
| CN | 2092880 | U | 1/1992 |
| CN | 1059649 | A | 3/1992 |
| CN | 2144261 | Y | 10/1993 |
| CN | 1106812 | A | 8/1995 |
| CN | 2220168 | Y | 2/1996 |
| CN | 1121385 | A | 4/1996 |
| CN | 1122213 | A | 5/1996 |
| CN | 1123000 | A | 5/1996 |
| CN | 1123001 | A | 5/1996 |
| CN | 1126426 | A | 7/1996 |
| CN | 2246744 | Y | 2/1997 |
| CN | 1158757 | A | 9/1997 |
| CN | 1161635 | A | 10/1997 |
| CN | 1195270 | A | 10/1998 |
| CN | 1196660 | A | 10/1998 |
| CN | 1196661 | A | 10/1998 |
| CN | 1205849 | A | 1/1999 |
| CN | 1209731 | A | 3/1999 |
| CN | 1287890 | A | 3/2001 |
| CN | 1293591 | A | 5/2001 |
| CN | 1293596 | A | 5/2001 |
| CN | 1312730 | A | 9/2001 |
| CN | 1106812 | C | 4/2003 |
| CN | 1130109 | C | 12/2003 |
| CN | 1130137 | C | 12/2003 |
| CN | 2598364 | Y | 1/2004 |
| CN | 1495417 | A | 5/2004 |
| CN | 1151739 | C | 6/2004 |
| CN | 1545823 | A | 11/2004 |
| CN | 1575135 | A | 2/2005 |
| CN | 1578895 | A | 2/2005 |
| CN | 1641976 | A | 7/2005 |
| CN | 2719043 | Y | 8/2005 |
| CN | 1679419 | A | 10/2005 |
| CN | 1694765 | A | 11/2005 |
| CN | 1703279 | A | 11/2005 |
| CN | 200966824 | Y | 10/2007 |
| CN | 101084034 | A | 12/2007 |
| CN | 201076006 | Y | 6/2008 |
| CN | 101238047 | A | 8/2008 |
| CN | 101267749 | A | 9/2008 |
| CN | 101277622 | A | 10/2008 |
| CN | 101282660 | A | 10/2008 |
| CN | 201185656 | Y | 1/2009 |
| CN | 101390659 | A | 3/2009 |
| CN | 201199922 | Y | 3/2009 |
| CN | 201238609 | Y | 5/2009 |
| CN | 101500443 | A | 8/2009 |
| CN | 101516425 | A | 8/2009 |
| CN | 101557728 | A | 10/2009 |
| CN | 201375023 | Y | 1/2010 |
| CN | 101648041 | A | 2/2010 |
| CN | 201445686 | U | 5/2010 |
| CN | 101878958 | A | 11/2010 |
| CN | 101912654 | A | 12/2010 |
| CN | 101925309 | A | 12/2010 |
| CN | 102014677 | A | 4/2011 |
| CN | 201869778 | U | 6/2011 |
| CN | 102131411 | A | 7/2011 |
| CN | 102186271 | A | 9/2011 |
| CN | 102212340 | A | 10/2011 |
| CN | 202172846 | U | 3/2012 |
| CN | 102483237 | A | 5/2012 |
| CN | 102499466 | A | 6/2012 |
| CN | 102539005 | A | 7/2012 |
| CN | 102575954 | A | 7/2012 |
| CN | 102604599 | A | 7/2012 |
| CN | 202351223 | U | 7/2012 |
| CN | 102655773 | A | 9/2012 |
| CN | 202722498 | U | 2/2013 |
| CN | 202750708 | U | 2/2013 |
| CN | 103052380 | A | 4/2013 |
| CN | 103054196 | A | 4/2013 |
| CN | 103202540 | A | 7/2013 |
| CN | 103359550 | A | 10/2013 |
| CN | 203369386 | U | 1/2014 |
| CN | 103608619 | A | 2/2014 |
| CN | 103689812 | A | 4/2014 |
| CN | 103689815 | A | 4/2014 |
| CN | 103763954 | A | 4/2014 |
| CN | 103974640 | A | 8/2014 |
| CN | 103997922 | A | 8/2014 |
| CN | 104010531 | A | 8/2014 |
| CN | 203748673 | U | 8/2014 |
| CN | 203761188 | U | 8/2014 |
| CN | 203762288 | U | 8/2014 |
| CN | 104039183 | A | 9/2014 |
| CN | 104095291 | A | 10/2014 |
| CN | 104095293 | A | 10/2014 |
| CN | 104095295 | A | 10/2014 |
| CN | 203952405 | U | 11/2014 |
| CN | 104203016 | A | 12/2014 |
| CN | 104223359 | A | 12/2014 |
| CN | 203986095 | U | 12/2014 |
| CN | 104256899 | A | 1/2015 |
| CN | 204091003 | U | 1/2015 |
| CN | 204120226 | U | 1/2015 |
| CN | 104540406 | A | 4/2015 |
| CN | 104619202 | A | 5/2015 |
| CN | 104664608 | A | 6/2015 |
| CN | 104677116 | A | 6/2015 |
| CN | 104703308 | A | 6/2015 |
| CN | 104720121 | A | 6/2015 |
| CN | 204440191 | U | 7/2015 |
| CN | 204519365 | U | 8/2015 |
| CN | 204539505 | U | 8/2015 |
| CN | 204599333 | U | 9/2015 |
| CN | 204949521 | U | 1/2016 |
| CN | 105307524 | A | 2/2016 |
| CN | 105307525 | A | 2/2016 |
| CN | 106102863 | A | 11/2016 |
| CN | 106455712 | A | 2/2017 |
| CN | 106617325 | A | 5/2017 |
| CN | 109330030 | A | 2/2019 |
| DE | 360431 | C | 10/1922 |
| DE | 1100884 | B | 3/1961 |
| DE | 1425872 | A1 | 11/1968 |
| DE | 1290499 | B | 3/1969 |
| DE | 1813993 | A1 | 6/1970 |
| DE | 1425871 | B1 | 10/1970 |
| DE | 1950439 | A1 | 4/1971 |
| DE | 2315789 | A1 | 10/1973 |
| DE | 3148335 | A1 | 7/1983 |
| DE | 3218760 | A1 | 12/1983 |
| DE | 3936687 | A1 | 5/1990 |
| DE | 4105370 | A1 | 8/1992 |
| DE | 4307144 | C2 | 1/1995 |
| DE | 4343578 | A1 | 6/1995 |
| DE | 29509286 | U1 | 8/1995 |
| DE | 4420366 | A1 | 12/1995 |
| DE | 29700307 | U1 | 4/1997 |
| DE | 29713866 | U1 | 10/1997 |
| DE | 29719509 | U1 | 1/1998 |
| DE | 19630619 | A1 | 2/1998 |
| DE | 19654945 | A1 | 3/1998 |
| DE | 19854007 | A1 | 5/2000 |
| DE | 19854009 | A1 | 5/2000 |
| DE | 10058642 | A1 | 6/2001 |
| DE | 10007521 | A1 | 8/2001 |
| DE | 10064288 | A1 | 8/2001 |
| DE | 10164587 | A1 | 7/2003 |
| DE | 10330681 | B3 | 6/2004 |
| DE | 102005024803 | A1 | 6/2006 |
| DE | 202006013439 | U1 | 10/2006 |
| DE | 102005023278 | A1 | 11/2006 |
| DE | 102005056885 | A1 | 5/2007 |
| DE | 102006041544 | A1 | 8/2007 |

(56) References Cited

FOREIGN PATENT DOCUMENTS

| | | | |
|---|---|---|---|
| DE | 102006041042 | A1 | 3/2008 |
| DE | 102006047146 | A1 | 4/2008 |
| DE | 102007011120 | A1 | 9/2008 |
| DE | 102008034509 | A1 | 4/2009 |
| DE | 102008013303 | A1 | 9/2009 |
| DE | 202009010400 | U1 | 11/2009 |
| DE | 102008038121 | A1 | 2/2010 |
| DE | 202010011436 | U1 | 11/2010 |
| DE | 102009047185 | A1 | 6/2011 |
| DE | 102010046482 | A1 | 3/2012 |
| DE | 202013100606 | U1 | 2/2013 |
| DE | 102013002555 | A1 | 6/2014 |
| DK | 114399 | B | 6/1969 |
| DK | 488488 | A | 3/1989 |
| DK | 0540774 | T3 | 7/1995 |
| DK | 0540775 | T3 | 8/1997 |
| EP | 0033668 | A1 | 8/1981 |
| EP | 0076897 | A1 | 4/1983 |
| EP | 0033668 | B1 | 6/1983 |
| EP | 0149997 | A2 | 7/1985 |
| EP | 0194257 | A1 | 9/1986 |
| EP | 0280262 | A2 | 8/1988 |
| EP | 0295122 | A2 | 12/1988 |
| EP | 0309227 | A2 | 3/1989 |
| EP | 0358002 | A2 | 3/1990 |
| EP | 0358114 | A2 | 3/1990 |
| EP | 0371285 | A2 | 6/1990 |
| EP | 0418464 | A2 | 3/1991 |
| EP | 0430559 | A2 | 6/1991 |
| EP | 0430566 | A2 | 6/1991 |
| EP | 0438862 | A2 | 7/1991 |
| EP | 0444553 | A2 | 9/1991 |
| EP | 0488488 | A1 | 6/1992 |
| EP | 0491952 | A1 | 7/1992 |
| EP | 0503767 | A1 | 9/1992 |
| EP | 0503794 | A1 | 9/1992 |
| EP | 0520231 | A2 | 12/1992 |
| EP | 0603613 | A1 | 6/1994 |
| EP | 0430559 | B1 | 3/1995 |
| EP | 0703735 | A1 | 4/1996 |
| EP | 0354661 | B1 | 4/1997 |
| EP | 0540775 | B1 | 7/1997 |
| EP | 0823492 | A2 | 2/1998 |
| EP | 0824927 | A2 | 2/1998 |
| EP | 0845220 | A1 | 6/1998 |
| EP | 0857431 | A1 | 8/1998 |
| EP | 0653218 | B1 | 9/1998 |
| EP | 0884928 | A1 | 12/1998 |
| EP | 0893071 | A1 | 1/1999 |
| EP | 1064083 | A2 | 1/2001 |
| EP | 1064101 | A2 | 1/2001 |
| EP | 1076014 | A2 | 2/2001 |
| EP | 1111191 | A2 | 6/2001 |
| EP | 0703735 | B1 | 7/2001 |
| EP | 1128741 | A1 | 9/2001 |
| EP | 1128742 | A1 | 9/2001 |
| EP | 1128743 | A1 | 9/2001 |
| EP | 1148905 | A2 | 10/2001 |
| EP | 1166814 | A2 | 1/2002 |
| EP | 1166847 | A2 | 1/2002 |
| EP | 1203189 | A1 | 5/2002 |
| EP | 1217320 | A2 | 6/2002 |
| EP | 1298993 | A1 | 4/2003 |
| EP | 1299499 | A1 | 4/2003 |
| EP | 1299500 | A2 | 4/2003 |
| EP | 1301152 | A2 | 4/2003 |
| EP | 0845220 | B1 | 9/2003 |
| EP | 1349601 | A2 | 10/2003 |
| EP | 1357025 | A2 | 10/2003 |
| EP | 1390112 | A1 | 2/2004 |
| EP | 1409051 | A2 | 4/2004 |
| EP | 1439876 | A2 | 7/2004 |
| EP | 1454840 | A1 | 9/2004 |
| EP | 1490452 | A2 | 12/2004 |
| EP | 1506792 | A2 | 2/2005 |
| EP | 1609376 | A1 | 12/2005 |
| EP | 1618803 | A1 | 1/2006 |
| EP | 1625334 | A2 | 2/2006 |
| EP | 1625335 | A2 | 2/2006 |
| EP | 1625336 | A2 | 2/2006 |
| EP | 1454840 | B1 | 9/2006 |
| EP | 1536703 | B1 | 9/2006 |
| EP | 1702639 | A2 | 9/2006 |
| EP | 1736065 | A1 | 12/2006 |
| EP | 1749548 | A2 | 2/2007 |
| EP | 1757921 | A2 | 2/2007 |
| EP | 1867357 | A1 | 12/2007 |
| EP | 1891867 | A2 | 2/2008 |
| EP | 1940254 | A2 | 7/2008 |
| EP | 1996880 | A2 | 12/2008 |
| EP | 2011033 | A2 | 1/2009 |
| EP | 2018886 | A1 | 1/2009 |
| EP | 2022349 | A1 | 2/2009 |
| EP | 2044967 | A1 | 4/2009 |
| EP | 1357025 | B1 | 7/2009 |
| EP | 2083642 | A1 | 8/2009 |
| EP | 2110033 | A1 | 10/2009 |
| EP | 2110034 | A1 | 10/2009 |
| EP | 2113178 | A1 | 11/2009 |
| EP | 2138058 | A1 | 12/2009 |
| EP | 2138059 | A1 | 12/2009 |
| EP | 1947965 | B1 | 2/2010 |
| EP | 2179229 | A2 | 4/2010 |
| EP | 2191735 | A1 | 6/2010 |
| EP | 2227973 | A1 | 9/2010 |
| EP | 2234508 | A2 | 10/2010 |
| EP | 2241203 | A2 | 10/2010 |
| EP | 2138057 | B1 | 11/2010 |
| EP | 2246086 | A2 | 11/2010 |
| EP | 2249669 | A1 | 11/2010 |
| EP | 2253541 | A1 | 11/2010 |
| EP | 2257195 | A1 | 12/2010 |
| EP | 2277398 | A1 | 1/2011 |
| EP | 2303043 | A2 | 4/2011 |
| EP | 2316286 | A1 | 5/2011 |
| EP | 2327318 | A1 | 6/2011 |
| EP | 2330866 | A2 | 6/2011 |
| EP | 2340729 | A1 | 7/2011 |
| EP | 2340730 | A1 | 7/2011 |
| EP | 2368449 | A1 | 9/2011 |
| EP | 2003997 | B1 | 10/2011 |
| EP | 2394520 | A1 | 12/2011 |
| EP | 2408494 | A1 | 1/2012 |
| EP | 2444112 | A1 | 4/2012 |
| EP | 2253541 | B1 | 5/2012 |
| EP | 2472185 | A1 | 7/2012 |
| EP | 2512205 | A1 | 10/2012 |
| EP | 2520186 | A1 | 11/2012 |
| EP | 2523752 | A1 | 11/2012 |
| EP | 2542131 | A2 | 1/2013 |
| EP | 2645814 | A1 | 10/2013 |
| EP | 2696652 | A1 | 2/2014 |
| EP | 2698070 | A1 | 2/2014 |
| EP | 2760303 | A2 | 8/2014 |
| EP | 2762019 | A1 | 8/2014 |
| EP | 2785208 | A1 | 10/2014 |
| EP | 2835062 | A1 | 2/2015 |
| EP | 2907397 | A1 | 8/2015 |
| EP | 2967156 | A1 | 1/2016 |
| EP | 2975958 | A1 | 1/2016 |
| EP | 2996504 | A1 | 3/2016 |
| EP | 2967156 | B1 | 11/2016 |
| EP | 2996504 | B1 | 11/2016 |
| EP | 3337342 | A1 | 6/2018 |
| EP | 3367828 | A1 | 9/2018 |
| ES | 262308 | U | 6/1982 |
| FR | 718708 | A | 1/1932 |
| FR | 960469 | A | 4/1950 |
| FR | 1418189 | A | 11/1965 |
| FR | 2573985 | A1 | 6/1986 |
| FR | 2604093 | A1 | 3/1988 |
| FR | 2700697 | A1 | 7/1994 |
| FR | 2730166 | A1 | 8/1996 |
| FR | 2818152 | A1 | 6/2002 |

(56) References Cited

FOREIGN PATENT DOCUMENTS

| | | | |
|---|---|---|---|
| FR | 2842791 | B1 | 4/2005 |
| FR | 2873584 | B1 | 11/2006 |
| GB | 25575 | | 3/1912 |
| GB | 191126138 | A | 3/1912 |
| GB | 347650 | A | 4/1931 |
| GB | 353745 | A | 7/1931 |
| GB | 426247 | A | 3/1935 |
| GB | 910166 | A | 11/1962 |
| GB | 922310 | A | 3/1963 |
| GB | 958867 | A | 5/1964 |
| GB | 1104214 | A | 2/1968 |
| GB | 1227333 | A | 4/1971 |
| GB | 1313525 | A | 4/1973 |
| GB | 1379688 | A | 1/1975 |
| GB | 1431334 | A | 4/1976 |
| GB | 2294401 | A | 5/1996 |
| GB | 2323033 | A | 9/1998 |
| GB | 2342874 | A | 4/2000 |
| GB | 2388040 | A | 11/2003 |
| GB | 2412326 | A | 9/2005 |
| GB | 2412876 | A | 10/2005 |
| GB | 2448478 | A | 10/2008 |
| GB | 2487851 | A | 8/2012 |
| GB | 2495923 | A | 5/2013 |
| GB | 2504732 | A | 2/2014 |
| HK | 1196511 | A1 | 12/2014 |
| HK | 1226611 | | 10/2017 |
| IE | 63083 | B1 | 3/1995 |
| IT | 1289590 | B1 | 10/1998 |
| IT | RM20120193 | A1 | 8/2012 |
| JP | S4961986 | A | 6/1974 |
| JP | S5096908 | A | 8/1975 |
| JP | S5314173 | A | 2/1978 |
| JP | S5594260 | A | 7/1980 |
| JP | S5752456 | A | 3/1982 |
| JP | S57110260 | A | 7/1982 |
| JP | S57177769 | A | 11/1982 |
| JP | S59106340 | A | 6/1984 |
| JP | S6196763 | A | 5/1986 |
| JP | S6196765 | A | 5/1986 |
| JP | S62501050 | A | 4/1987 |
| JP | S62205184 | A | 9/1987 |
| JP | S6360322 | A | 3/1988 |
| JP | S63153666 | A | 6/1988 |
| JP | H01191674 | A | 8/1989 |
| JP | H01166953 | U | 11/1989 |
| JP | H0292986 | A | 4/1990 |
| JP | H0292988 | A | 4/1990 |
| JP | H02124081 | A | 5/1990 |
| JP | H02127493 | A | 5/1990 |
| JP | H02190171 | A | 7/1990 |
| JP | H034479 | A | 1/1991 |
| JP | H0341185 | A | 2/1991 |
| JP | H03112478 | A | 5/1991 |
| JP | H03192677 | A | 8/1991 |
| JP | H03232481 | A | 10/1991 |
| JP | H05103836 | A | 4/1993 |
| JP | H05115272 | A | 5/1993 |
| JP | H05193668 | A | 8/1993 |
| JP | H05212100 | A | 8/1993 |
| JP | H05309136 | A | 11/1993 |
| JP | H062164 | B1 | 1/1994 |
| JP | H06189861 | A | 7/1994 |
| JP | H06295782 | A | 10/1994 |
| JP | H06315366 | A | 11/1994 |
| JP | H07147965 | A | 6/1995 |
| JP | H0851175 | A | 2/1996 |
| JP | H08942 | U | 6/1996 |
| JP | 2519658 | B2 | 7/1996 |
| JP | H08228751 | A | 9/1996 |
| JP | H08299862 | A | 11/1996 |
| JP | H08511175 | A | 11/1996 |
| JP | H08511176 | A | 11/1996 |
| JP | H09107943 | A | 4/1997 |
| JP | H09257256 | A | 9/1997 |
| JP | 3044574 | U | 12/1997 |
| JP | 3053426 | U | 10/1998 |
| JP | H1189551 | A | 4/1999 |
| JP | H11503912 | A | 4/1999 |
| JP | H11125390 | A | 5/1999 |
| JP | H11169157 | A | 6/1999 |
| JP | H11507234 | A | 6/1999 |
| JP | H11178562 | A | 7/1999 |
| JP | H11514081 | A | 11/1999 |
| JP | 2000051556 | A | 2/2000 |
| JP | 3016586 | B2 | 3/2000 |
| JP | 2000082576 | A | 3/2000 |
| JP | 2000093155 | A | 4/2000 |
| JP | 2000119643 | A | 4/2000 |
| JP | 3078033 | B2 | 8/2000 |
| JP | 2000515576 | A | 11/2000 |
| JP | 3118462 | B2 | 12/2000 |
| JP | 3118463 | B2 | 12/2000 |
| JP | 2001063776 | A | 3/2001 |
| JP | 2002170657 | A | 6/2002 |
| JP | 2002527153 | A | 8/2002 |
| JP | 2002253593 | A | 9/2002 |
| JP | 2002529111 | A | 9/2002 |
| JP | 2002336290 | A | 11/2002 |
| JP | 2003034785 | A | 2/2003 |
| JP | 3392138 | B2 | 3/2003 |
| JP | 3413208 | B2 | 6/2003 |
| JP | 2004055547 | A | 2/2004 |
| JP | 2004504580 | A | 2/2004 |
| JP | 3588469 | B2 | 11/2004 |
| JP | 2004332069 | A | 11/2004 |
| JP | 2005036897 | A | 2/2005 |
| JP | 2005050624 | A | 2/2005 |
| JP | 2005106350 | A | 4/2005 |
| JP | 2005516647 | A | 6/2005 |
| JP | 2005524067 | A | 8/2005 |
| JP | 2005300005 | A | 10/2005 |
| JP | 2005537918 | A | 12/2005 |
| JP | 2005537919 | A | 12/2005 |
| JP | 2005538149 | A | 12/2005 |
| JP | 2005538159 | A | 12/2005 |
| JP | 2006501871 | A | 1/2006 |
| JP | 2006504431 | A | 2/2006 |
| JP | 2006219557 | A | 8/2006 |
| JP | 2006524494 | A | 11/2006 |
| JP | 2007057532 | A | 3/2007 |
| JP | 2007512880 | A | 5/2007 |
| JP | 2007516015 | A | 6/2007 |
| JP | 2007522900 | A | 8/2007 |
| JP | 2008035742 | A | 2/2008 |
| JP | 2008509907 | A | 4/2008 |
| JP | 2008511175 | A | 4/2008 |
| JP | 2008518614 | A | 6/2008 |
| JP | 2008249003 | A | 10/2008 |
| JP | 2008311058 | A | 12/2008 |
| JP | 2009501537 | A | 1/2009 |
| JP | 2009509523 | A | 3/2009 |
| JP | 2009087703 | A | 4/2009 |
| JP | 2009537119 | A | 10/2009 |
| JP | 2009537120 | A | 10/2009 |
| JP | 2010041354 | A | 2/2010 |
| JP | 2010506594 | A | 3/2010 |
| JP | 2010178730 | A | 8/2010 |
| JP | 2010526553 | A | 8/2010 |
| JP | 2010213579 | A | 9/2010 |
| JP | 2010535530 | A | 11/2010 |
| JP | 2011058538 | A | 3/2011 |
| JP | 2011509667 | A | 3/2011 |
| JP | 2011515080 | A | 5/2011 |
| JP | 2011515093 | A | 5/2011 |
| JP | 2011113977 | A | 6/2011 |
| JP | 2011518567 | A | 6/2011 |
| JP | 2011135901 | A | 7/2011 |
| JP | 2011525366 | A | 9/2011 |
| JP | 2012506263 | A | 3/2012 |
| JP | 2012529936 | A | 11/2012 |
| JP | 2012249854 | A | 12/2012 |
| JP | 2013054873 | A | 3/2013 |
| JP | 2013073939 | A | 4/2013 |

(56) References Cited

FOREIGN PATENT DOCUMENTS

| | | | |
|---|---|---|---|
| JP | 5193668 | B2 | 5/2013 |
| JP | 5217980 | B2 | 6/2013 |
| JP | 2013150593 | A | 8/2013 |
| JP | 2014519586 | A | 8/2014 |
| JP | 2014525251 | A | 9/2014 |
| JP | 2014526275 | A | 10/2014 |
| JP | 2014527606 | A | 10/2014 |
| JP | 2014229498 | A | 12/2014 |
| JP | 2014533513 | A | 12/2014 |
| JP | 2015503336 | A | 2/2015 |
| JP | 2015503337 | A | 2/2015 |
| JP | 2015504667 | A | 2/2015 |
| JP | 2015060837 | A | 3/2015 |
| JP | 2015506170 | A | 3/2015 |
| JP | 2015508287 | A | 3/2015 |
| JP | 2015509706 | A | 4/2015 |
| JP | 2015098645 | A | 5/2015 |
| JP | 2015513922 | A | 5/2015 |
| JP | 2015513970 | A | 5/2015 |
| JP | 2015531601 | A | 11/2015 |
| JP | 2016036222 | A | 3/2016 |
| JP | 2016524777 | A | 8/2016 |
| JP | 2016525341 | A | 8/2016 |
| JP | 2016189525 | A | 11/2016 |
| JP | 2017515490 | A | 6/2017 |
| JP | 2017520234 | A | 7/2017 |
| JP | 2017526381 | A | 9/2017 |
| JP | 6217980 | B2 | 10/2017 |
| JP | 2017533732 | A | 11/2017 |
| JP | 2018520664 | A | 8/2018 |
| JP | 2019065344 | A | 4/2019 |
| JP | 2020182327 | A | 11/2020 |
| JP | 2021508438 | A | 3/2021 |
| JP | 2021078359 | A | 5/2021 |
| KR | 19910008188 | B1 | 10/1991 |
| KR | 950700692 | A | 2/1995 |
| KR | 960702734 | A | 5/1996 |
| KR | 0178388 | B1 | 2/1999 |
| KR | 19990081973 | A | 11/1999 |
| KR | 100286488 | B1 | 4/2001 |
| KR | 100341602 | B1 | 11/2002 |
| KR | 100385395 | B1 | 8/2003 |
| KR | 100393327 | B1 | 10/2003 |
| KR | 200350504 | Y1 | 5/2004 |
| KR | 20040068292 | A | 7/2004 |
| KR | 200370872 | Y1 | 12/2004 |
| KR | 100636287 | B1 | 10/2006 |
| KR | 20070038350 | A | 4/2007 |
| KR | 100757450 | B1 | 9/2007 |
| KR | 20070096027 | A | 10/2007 |
| KR | 20080060218 | A | 7/2008 |
| KR | 100971178 | B1 | 7/2010 |
| KR | 20100135865 | A | 12/2010 |
| KR | 20120003484 | U | 5/2012 |
| KR | 20120104533 | A | 9/2012 |
| KR | 20130029697 | A | 3/2013 |
| KR | 20130006714 | U | 11/2013 |
| KR | 20140068808 | A | 6/2014 |
| KR | 20140123487 | A | 10/2014 |
| KR | 20150143877 | A | 12/2015 |
| KR | 20150143891 | A | 12/2015 |
| MX | 2009001096 | A | 3/2009 |
| MX | 2014011283 | A | 10/2014 |
| RU | 2066337 | C1 | 9/1996 |
| RU | 2098446 | C1 | 12/1997 |
| RU | 2135054 | C1 | 8/1999 |
| RU | 2285028 | C1 | 10/2006 |
| RU | 2311859 | C2 | 12/2007 |
| RU | 2336001 | C2 | 10/2008 |
| RU | 2349234 | C2 | 3/2009 |
| RU | 89927 | U1 | 12/2009 |
| RU | 94815 | U1 | 6/2010 |
| RU | 103281 | U1 | 4/2011 |
| RU | 115629 | U1 | 5/2012 |
| RU | 122000 | U1 | 11/2012 |
| RU | 122254 | U1 | 11/2012 |
| RU | 124120 | U1 | 1/2013 |
| RU | 132318 | U1 | 9/2013 |
| RU | 2509516 | C2 | 3/2014 |
| RU | 2015105675 | A | 8/2015 |
| RU | 2013155697 | A | 10/2015 |
| RU | 2614615 | C2 | 3/2017 |
| RU | 2016150117 | A | 6/2018 |
| RU | 2687811 | C1 | 5/2019 |
| SE | 7415242 | A | 6/1975 |
| SE | 502503 | L | 10/2006 |
| TW | 274507 | B | 4/1996 |
| TW | 201325481 | A | 7/2013 |
| WO | WO-8404698 | A1 | 12/1984 |
| WO | WO-8601730 | A1 | 3/1986 |
| WO | 8602528 | A1 | 5/1986 |
| WO | WO-9013326 | A1 | 11/1990 |
| WO | WO-9406314 | A1 | 3/1994 |
| WO | WO-9409842 | A1 | 5/1994 |
| WO | 9418860 | A1 | 9/1994 |
| WO | WO-9527411 | A1 | 10/1995 |
| WO | 9632854 | A2 | 10/1996 |
| WO | WO-9639880 | A1 | 12/1996 |
| WO | 9748293 | A1 | 12/1997 |
| WO | WO-9805906 | A1 | 2/1998 |
| WO | 9817131 | A1 | 4/1998 |
| WO | WO-9823171 | A1 | 6/1998 |
| WO | WO-9835552 | A1 | 8/1998 |
| WO | WO-9914402 | A1 | 3/1999 |
| WO | WO-9947273 | A2 | 9/1999 |
| WO | WO-9947806 | A2 | 9/1999 |
| WO | 0009188 | A1 | 2/2000 |
| WO | 0021598 | A1 | 4/2000 |
| WO | 0028842 | A1 | 5/2000 |
| WO | WO-0028843 | A1 | 5/2000 |
| WO | 0045878 | A2 | 8/2000 |
| WO | 0050111 | A1 | 8/2000 |
| WO | WO-0104548 | A1 | 1/2001 |
| WO | WO-0140717 | A1 | 6/2001 |
| WO | WO-0163183 | A1 | 8/2001 |
| WO | 0167819 | A1 | 9/2001 |
| WO | WO-0205620 | A2 | 1/2002 |
| WO | WO-0205640 | A1 | 1/2002 |
| WO | WO-0206421 | A1 | 1/2002 |
| WO | WO-0207656 | A2 | 1/2002 |
| WO | WO-0224262 | A2 | 3/2002 |
| WO | 02051468 | A2 | 7/2002 |
| WO | WO-02051466 | A2 | 7/2002 |
| WO | 02058747 | A1 | 8/2002 |
| WO | WO-02096532 | A1 | 12/2002 |
| WO | WO-02098389 | A1 | 12/2002 |
| WO | 03012565 | A1 | 2/2003 |
| WO | 03028409 | A1 | 4/2003 |
| WO | WO-03037412 | A2 | 5/2003 |
| WO | 03050405 | A1 | 6/2003 |
| WO | WO-03049792 | A1 | 6/2003 |
| WO | 03056948 | A1 | 7/2003 |
| WO | 03059413 | A2 | 7/2003 |
| WO | 03070031 | A1 | 8/2003 |
| WO | 03083283 | A1 | 10/2003 |
| WO | WO-03083007 | A2 | 10/2003 |
| WO | 03101454 | A1 | 12/2003 |
| WO | 03103387 | A2 | 12/2003 |
| WO | 2004022128 | A2 | 3/2004 |
| WO | 2004022242 | A1 | 3/2004 |
| WO | 2004022243 | A1 | 3/2004 |
| WO | 2004089126 | A1 | 10/2004 |
| WO | WO-2004098324 | A2 | 11/2004 |
| WO | WO-2004104491 | A2 | 12/2004 |
| WO | WO-2004104492 | A2 | 12/2004 |
| WO | WO-2004104493 | A2 | 12/2004 |
| WO | 2005106350 | A2 | 11/2005 |
| WO | WO-2006022714 | A1 | 3/2006 |
| WO | 2006082571 | A1 | 8/2006 |
| WO | 2007012007 | A2 | 1/2007 |
| WO | 2007017482 | A1 | 2/2007 |
| WO | 2007040941 | A1 | 4/2007 |
| WO | WO-2007042941 | A2 | 4/2007 |
| WO | WO-2007051163 | A2 | 5/2007 |

(56) References Cited

FOREIGN PATENT DOCUMENTS

| | | | |
|---|---|---|---|
| WO | WO-2007054167 | A1 | 5/2007 |
| WO | WO-2007078273 | A1 | 7/2007 |
| WO | WO-2007090594 | A1 | 8/2007 |
| WO | WO-2007098337 | A2 | 8/2007 |
| WO | 2007109811 | A2 | 9/2007 |
| WO | 2007113617 | A2 | 10/2007 |
| WO | WO-2007116915 | A1 | 10/2007 |
| WO | 2007131449 | A1 | 11/2007 |
| WO | 2007131450 | A1 | 11/2007 |
| WO | 2007141668 | A2 | 12/2007 |
| WO | WO-2008015441 | A1 | 2/2008 |
| WO | WO-2008029381 | A2 | 3/2008 |
| WO | 2008038144 | A2 | 4/2008 |
| WO | WO-2008051909 | A1 | 5/2008 |
| WO | WO-2008069883 | A1 | 6/2008 |
| WO | 2008108889 | A1 | 9/2008 |
| WO | 2008121610 | A1 | 10/2008 |
| WO | 2009001082 | A1 | 12/2008 |
| WO | WO-2008151777 | A2 | 12/2008 |
| WO | WO-2009006521 | A2 | 1/2009 |
| WO | 2009015410 | A1 | 2/2009 |
| WO | 2009022232 | A2 | 2/2009 |
| WO | WO-2009042955 | A2 | 4/2009 |
| WO | WO-2009079641 | A2 | 6/2009 |
| WO | WO-2009092862 | A1 | 7/2009 |
| WO | WO-2009118085 | A1 | 10/2009 |
| WO | 2009132793 | A1 | 11/2009 |
| WO | WO-2009152651 | A1 | 12/2009 |
| WO | WO-2009155957 | A1 | 12/2009 |
| WO | WO-2009156181 | A2 | 12/2009 |
| WO | WO-2010017586 | A1 | 2/2010 |
| WO | 2010045670 | A1 | 4/2010 |
| WO | 2010045671 | A1 | 4/2010 |
| WO | WO-2010041354 | A1 | 4/2010 |
| WO | WO-2010047389 | A1 | 4/2010 |
| WO | WO-2010053467 | A1 | 5/2010 |
| WO | WO-2010060537 | A1 | 6/2010 |
| WO | 2010073018 | A1 | 7/2010 |
| WO | 2010102832 | A1 | 9/2010 |
| WO | WO-2010107613 | A1 | 9/2010 |
| WO | 2010118644 | A1 | 10/2010 |
| WO | 2010133342 | A1 | 11/2010 |
| WO | 2011045609 | A1 | 4/2011 |
| WO | 2011050943 | A1 | 5/2011 |
| WO | 2011050964 | A1 | 5/2011 |
| WO | 2011063970 | A1 | 6/2011 |
| WO | 2011068020 | A1 | 6/2011 |
| WO | 2011070785 | A1 | 6/2011 |
| WO | 2011079932 | A1 | 7/2011 |
| WO | WO-2011088132 | A1 | 7/2011 |
| WO | WO-2011101164 | A1 | 8/2011 |
| WO | 2011109849 | A1 | 9/2011 |
| WO | WO-2011109304 | A2 | 9/2011 |
| WO | WO-2011117580 | A2 | 9/2011 |
| WO | 2012014490 | A1 | 2/2012 |
| WO | 2012025496 | A1 | 3/2012 |
| WO | WO-2012054973 | A1 | 5/2012 |
| WO | WO-2012072770 | A1 | 6/2012 |
| WO | WO-2012072790 | A1 | 6/2012 |
| WO | WO-2012078865 | A2 | 6/2012 |
| WO | WO-2012100430 | A1 | 8/2012 |
| WO | 2013022936 | A1 | 2/2013 |
| WO | 2013034453 | A1 | 3/2013 |
| WO | 2013034454 | A1 | 3/2013 |
| WO | 2013034459 | A1 | 3/2013 |
| WO | 2013034460 | A1 | 3/2013 |
| WO | WO-2013034455 | A1 | 3/2013 |
| WO | WO-2013034458 | A1 | 3/2013 |
| WO | 2013057185 | A1 | 4/2013 |
| WO | WO-2013076098 | A2 | 5/2013 |
| WO | 2013082173 | A1 | 6/2013 |
| WO | WO-2013098395 | A1 | 7/2013 |
| WO | WO-2013098405 | A2 | 7/2013 |
| WO | WO-2013098409 | A1 | 7/2013 |
| WO | WO-2013098410 | A2 | 7/2013 |
| WO | WO-2013102609 | A2 | 7/2013 |
| WO | 2013113612 | A1 | 8/2013 |
| WO | 2013116558 | A1 | 8/2013 |
| WO | 2013116572 | A1 | 8/2013 |
| WO | 2013131764 | A1 | 9/2013 |
| WO | 2013152873 | A1 | 10/2013 |
| WO | 2013160112 | A2 | 10/2013 |
| WO | 2013178767 | A1 | 12/2013 |
| WO | 2014012906 | A1 | 1/2014 |
| WO | 2014037794 | A2 | 3/2014 |
| WO | 2014045025 | A2 | 3/2014 |
| WO | 2014061477 | A1 | 4/2014 |
| WO | WO-2014048475 | A1 | 4/2014 |
| WO | WO-2014048745 | A1 | 4/2014 |
| WO | 2014130695 | A1 | 8/2014 |
| WO | 2014140320 | A1 | 9/2014 |
| WO | 2014150131 | A1 | 9/2014 |
| WO | WO-2014147114 | A1 | 9/2014 |
| WO | 2014201432 | A1 | 12/2014 |
| WO | 2015022321 | A1 | 2/2015 |
| WO | 2015052192 | A1 | 4/2015 |
| WO | WO-2015051646 | A1 | 4/2015 |
| WO | 2015062983 | A2 | 5/2015 |
| WO | WO-2015068936 | A1 | 5/2015 |
| WO | 2015082649 | A1 | 6/2015 |
| WO | WO-2015082648 | A1 | 6/2015 |
| WO | WO-2015082651 | A1 | 6/2015 |
| WO | WO-2015082652 | A1 | 6/2015 |
| WO | 2015114328 | A1 | 8/2015 |
| WO | 2015140312 | A1 | 9/2015 |
| WO | WO-2015131058 | A1 | 9/2015 |
| WO | 2015165812 | A1 | 11/2015 |
| WO | 2015175568 | A1 | 11/2015 |
| WO | 2015177043 | A1 | 11/2015 |
| WO | 2015177252 | A1 | 11/2015 |
| WO | 2015177254 | A1 | 11/2015 |
| WO | 2015177256 | A1 | 11/2015 |
| WO | 2015177257 | A1 | 11/2015 |
| WO | WO-2015177044 | A1 | 11/2015 |
| WO | WO-2015177045 | A1 | 11/2015 |
| WO | WO-2015177255 | A1 | 11/2015 |
| WO | WO-2015177263 | A1 | 11/2015 |
| WO | WO-2015177264 | A1 | 11/2015 |
| WO | WO-2015177265 | A1 | 11/2015 |
| WO | WO-2015177294 | A1 | 11/2015 |
| WO | WO-2015198015 | A1 | 12/2015 |
| WO | WO-2016014652 | A1 | 1/2016 |
| WO | WO-2016075436 | A1 | 5/2016 |
| WO | WO-2016156500 | A1 | 10/2016 |
| WO | WO-2016184928 | A1 | 11/2016 |
| WO | WO-2016184929 | A1 | 11/2016 |
| WO | WO-2016184930 | A1 | 11/2016 |
| WO | WO-2016200815 | A2 | 12/2016 |
| WO | WO-2017001819 | A1 | 1/2017 |
| WO | WO-2017005705 | A1 | 1/2017 |
| WO | WO-2017029268 | A1 | 2/2017 |
| WO | WO-2017029269 | A1 | 2/2017 |
| WO | WO-2017029270 | A1 | 2/2017 |
| WO | WO-2017036950 | A2 | 3/2017 |
| WO | WO-2017036955 | A2 | 3/2017 |
| WO | WO-2017036959 | A1 | 3/2017 |
| WO | WO-2017068094 | A1 | 4/2017 |
| WO | WO-2017068098 | A1 | 4/2017 |
| WO | WO-2017068099 | A1 | 4/2017 |
| WO | 2017072145 | A1 | 5/2017 |
| WO | 2017085242 | A1 | 5/2017 |
| WO | 2017149093 | A1 | 9/2017 |
| WO | 2017194769 | A1 | 11/2017 |
| WO | 2017205692 | A1 | 11/2017 |
| WO | WO-2017207581 | A1 | 12/2017 |
| WO | WO-2018002083 | A1 | 1/2018 |
| WO | 2018073376 | A1 | 4/2018 |

(56) References Cited

FOREIGN PATENT DOCUMENTS

WO WO-2018178095 A1 10/2018
WO 2020047417 A1 3/2020

OTHER PUBLICATIONS

Application and File History for U.S. Appl. No. 14/840,652, filed Aug. 31, 2015, inventors Blandino et al.
Application and File History for U.S. Appl. No. 14/840,703, filed Aug. 31, 2015, inventors Wilke et al.
Application and File History for U.S. Appl. No. 14/840,731, filed Aug. 31, 2015, inventors Blandino et al.
Application and File History for U.S. Appl. No. 14/840,751, filed Aug. 31, 2015, inventors Blandino et al.
Application and File History for U.S. Appl. No. 14/840,854, filed Aug. 31, 2015, inventors Blandino et al.
Application and File History for U.S. Appl. No. 14/840,972, filed Aug. 31, 2015, inventors Wilke et al.
Application and File History for U.S. Appl. No. 14/927,529, filed Oct. 30, 2015, inventors Kaufman et al.
Application and File History for U.S. Appl. No. 14/927,532, filed Oct. 30, 2015, inventors Blandino et al.
Application and File History for U.S. Appl. No. 14/927,537, filed Oct. 30, 2015, inventors Kaufman et al.
Application and File History for U.S. Appl. No. 14/927,539, filed Oct. 30, 2015, inventors Blandino et al.
Application and File History for U.S. Appl. No. 14/927,551, filed Oct. 30, 2015, inventors Blandino et al.
Application and File History for U.S. Appl. No. 14/927,556, filed Oct. 30, 2015, inventors Blandino et al.
Application and File History for U.S. Appl. No. 15/754,801, filed Feb. 23, 2018, inventors Blandino et al.
Application and File History for U.S. Appl. No. 15/754,809, filed Feb. 23, 2018, Inventors Wilke et al.
Application and File History for U.S. Appl. No. 15/754,812, filed Feb. 23, 2018, Inventors Blandino et al.
Application and File History for U.S. Appl. No. 15/754,818, filed Feb. 23, 2018, Inventors Blandino et al.
Application and File History for U.S. Appl. No. 15/754,823, filed Feb. 23, 2018, Inventors Blandino et al.
Application and File History for U.S. Appl. No. 15/754,837, filed Feb. 23, 2018, Inventors Wilke et al.
Application and File History for U.S. Appl. No. 15/772,382, filed Apr. 30, 2018, Inventors Kaufman Wilke et al.
Application and File History for U.S. Appl. No. 15/772,386, filed Apr. 30, 2018, Inventors Blandino et al.
Chaplin M., "Hydrocolloids and Gums," retrieved from http://www1.lsbu.ac.uk/water/hydrocolloids_gums.html, Established in 2001, 7 pages.
"Scientific Principles," University of Illinois, retrieved from http://matse1.matse.illinois.edu/ceramics/prin.html, Accessed on Jun. 15, 2017, 13 pages.
CN203762288, Machine Translation, retrieved Online from Espacenet on Aug. 13, 2020, (http://worldwide.espacenet.com), 5 pages.
CN203762288U, "Atomization Device Applicable to Solid Tobacco Materials and Electronic Cigarette," retrieved from Google Patents https://patents.google.com/patent/CN203762288U/en on Jan. 12, 2018, 10 pages.
CN-203952405-U, "Tobacco Suction System Based on Electromagnetic Heating—Google Patents," (Machine Translation) [online], Retrieved on Nov. 29, 2021, Retrieved from Google Patents (https://patents.google.com/), 2014, 4 pages.
Decision to Grant a Patent dated Apr. 5, 2022 for Japanese Application No. 2020-182759, 5 pages.
English translation of CN101390659 dated Aug. 3, 2017, 8 pages.
European Extended Search Report for Application No. 19216472.1 dated Apr. 22, 2020, 13 Pages.
European Notice of Opposition for Application No. 13759537 dated Jan. 23, 2020, 83 pages.
Extended European Search Report for Application No. 19164405.3 dated Aug. 28, 2019, 6 pages.
Extended European Search Report for Application No. 19165045.6 dated Sep. 6, 2019, 7 Pages.
Extended European Search Report for Application No. 20179569.7 dated Oct. 2, 2020, 10 pages.
Extended European Search Report for Application No. 20205043.1, dated May 4, 2021, 10 pages.
Extended European Search Report for Application No. 20205057.1, dated Oct. 19, 2021, 20 pages.
Extended European Search Report For Application No. 20205544.8 dated Jun. 14, 2021, 9 pages.
Extended European Search Report for Application No. 21170804.5, dated Feb. 21, 2022, 13 pages.
Extended European Search Report for Application No. 21192233.1, dated Dec. 9, 2021, 11 pages.
Extended European Search Report for Application No. EP20205075.3, dated Jan. 27, 2021, 11 pages.
First Office Action dated Nov. 1, 2019 for Chinese Application No. 2016800498584, 6 pages.
First Office Action dated Dec. 3, 2015 for Chinese Application No. 201380021387.2, filed Apr. 11, 2011, 20 pages.
First Office Action dated May 5, 2016 for Chinese Application No. 201380048636.7, 25 pages.
Fourth Office Action and Search Report for Chinese Application No. 201680049479.5 dated Nov. 18, 2021, 20 pages.
Fourth Office Action and Search Report for Chinese Application No. 2016800498584 dated Jan. 6, 2022, 21 pages.
Gaohe Q., "Chinese Scientific Information," vol. 10, May 15, 2010, pp. 132-133.
INEOS., "Typical Engineering Properties of High Density Polyethylene," Olefins and Polymers, USA, retrieved from https://www.ineos.com/globalassets/ineos-group/businesses/ineos-olefins-and-polymers-USA/products/technical-information--patents/ineos-typical-engineering-properties-of-hdpe.pdf, Accessed Dec. 4, 2018, 2 pages.
International Preliminary Report on Patentability for Application No. PCT/EP2013/068797, dated Mar. 31, 2015, 5 pages.
International Preliminary Report on Patentability for Application No. PCT/EP2016/070176, dated Mar. 15, 2018, 12 pages.
International Preliminary Report on Patentability for Application No. PCT/EP2016/070178, dated Mar. 15, 2018, 8 pages.
International Preliminary Report on Patentability for Application No. PCT/EP2016/070182, dated Mar. 15, 2018, 8 pages.
International Preliminary Report on Patentability for Application No. PCT/EP2016/070185, dated Mar. 15, 2018, 11 pages.
International Preliminary Report on Patentability for Application No. PCT/EP2016/070188, dated Mar. 15, 2018, 8 pages.
International Preliminary Report on Patentability for Application No. PCT/EP2016/070191, dated Mar. 15, 2018, 8 pages.
International Preliminary Report on Patentability for Application No. PCT/EP2016/075734, dated May 11, 2018, 7 pages.
International Preliminary Report on Patentability for Application No. PCT/EP2016/075739, dated Jan. 16, 2018, 7 pages.
International Preliminary Report on Patentability for Application No. PCT/GB2013/052433, dated Mar. 24, 2015, 9 pages.
International Search Report and Written Opinion for Application No. PCT/EP2013/068797, dated Dec. 9, 2013, 8 pages.
International Search Report and Written Opinion for Application No. PCT/EP2016/070176, dated Apr. 19, 2017, 21 pages.
International Search Report and Written Opinion for Application No. PCT/EP2016/070178, dated Dec. 14, 2016, 10 pages.
International Search Report and Written Opinion for Application No. PCT/EP2016/070182, dated Dec. 12, 2016, 11 pages.
International Search Report and Written Opinion for Application No. PCT/EP2016/070185, dated Apr. 4, 2017, 16 pages.
International Search Report and Written Opinion for Application No. PCT/EP2016/070188, dated Dec. 13, 2016, 10 pages.
International Search Report and Written Opinion for Application No. PCT/EP2016/070191, dated Dec. 13, 2016, 10 pages.
International Search Report and Written Opinion for Application No. PCT/EP2016/075734, dated Apr. 6, 2017, 12 pages.
International Search Report and Written Opinion for Application No. PCT/EP2016/075739, dated Feb. 24, 2017, 10 pages.

(56) References Cited

OTHER PUBLICATIONS

International Search Report and Written Opinion for Application No. PCT/EP2016/085686, dated May 9, 2019, 16 pages.
International Search Report and Written Opinion for Application No. PCT/GB2013/052433, dated Jun. 30, 2014, 16 pages.
Iorga A., et al., "Low Curie Temperature in Fe—Cr—Ni—Mn Alloys," U.P.B. Sci.Bull., Series B, vol. 73 (4), 2011, pp. 195-202.
Jinshu Bangutai Jiagong Jishu, Metallurgical Industry Press, 10 pages, dated Jun. 30, 2012.
jrank.org, "Heat Capacity—Heat Capacity and Calorimetry, Heat Capacity and the Law of Conservation of Energy—Significance of the High Heat Capacity of Water," retrieved from https://science.jrank.org/pages/3265/Heat-Capacity.html, Accessed on Jun. 15, 2017, 2 pages.
Neomax Materials Co., Ltd., "NeoMax MS-135," retrieved from http://www.neomax-materials.co.jp/eng/pr0510.htm, as accessed on Oct. 30, 2015, 2 pages.
Notice of Reasons for Refusal dated Nov. 2, 2021 for Japanese Application No. 2020-182712, 6 pages.
Notice of Reasons for Refusal dated Jan. 25, 2022 for Japanese Application No. 2020-183045, 9 pages.
Notice of Reasons for Rejection for Japanese Application No. 2020-182759, dated Oct. 12, 2021, 5 pages.
Notice of Reasons for Rejection for Japanese Application No. 2020-182762, dated Dec. 7, 2021, 9 pages.
Notice of Reasons for Rejection dated Jan. 19, 2022 for Japanese Application No. 2020-183046, 6 pages.
Notification of Reasons for Refusal dated Feb. 1, 2016 for Japanese Application No. 2015531544, 5 pages.
Notification of Reasons for Refusal dated May 18, 2021 for Japanese Application No. 2020126181, 8 pages.
Office Action and Search Report dated May 6, 2020 for Chinese Application No. 2016800498156 filed Aug. 26, 2016, 7 pages.
Office Action and Search Report dated Feb. 25, 2020 for Taiwan Application No. 105127626 filed Aug. 29, 2016, 14 pages.
Office Action dated Feb. 15, 2021 for Ukraine Application No. 201801751, 4 pages.
Office Action dated Feb. 16, 2021 for Ukraine Application No. 201801846, 3 pages.
Office Action dated Oct. 18, 2019 for Chinese Application No. 201680049874.3, 18 pages.
Office Action dated Jan. 28, 2021 for Chinese Application No. 201680049874.3, 6 pages.
Office Action dated Aug. 5, 2020 for Chinese Application No. 201680049874.3, 14 pages.
Office Action for Chinese Application No. 201680049479.5, dated Feb. 4, 2021, 8 pages.
Office Action for Chinese Application No. 201680049858 dated Jul. 3, 2020, 35 pages.
Office Action for Chinese Application No. 201680049858.4, dated Apr. 1, 2022, 15 pages.
Office Action for Chinese Application No. 201680049858.4, dated Jul. 1, 2021, 13 pages.
Office Action for Japanese Application No. 2018-506381, dated Apr. 13, 2021, 5 pages.
Office Action for Japanese Application No. 2020-067569, dated Nov. 9, 2021, 6 pages.
Office Action for Japanese Application No. 2020-126181, dated Nov. 30, 2021, 4 pages.
Office Action for Japanese Application No. 2020-183056, dated Nov. 9, 2021, 14 pages.
Office Action for Malaysian Application No. PI2018700428, dated Mar. 1, 2021, 3 pages.
Office Action for Russian Application No. 2018115288, dated Oct. 17, 2018, 7 pages.
Office Action for Russian Application No. 2020121132, dated Aug. 6, 2021, 11 pages.
Office Action for Russian Application No. 2020135756, dated Jun. 30, 2021, 9 pages.
Office Action dated Jun. 8, 2021 for Japanese Application No. 2020-526233, 22 pages.
Office Action dated Sep. 1, 2020 for Japanese Application No. 2018-506381, 25 pages.
Office Action dated Nov. 12, 2019 for Japanese Application No. 2018-506575, 8 pages.
Office Action dated Sep. 12, 2019 for Chilean Application No. 201800521, 8 pages.
Office Action dated Feb. 13, 2019 for Japanese Application No. 2018-507624, 32 pages.
Office Action dated Mar. 13, 2018 for Japanese Application No. 2017-075527, 10 pages.
Office Action dated Sep. 13, 2017 for Russian Application No. 2015106592, 6 pages.
Office Action dated Feb. 14, 2019 for Canadian Application No. 2996835, 3 pages.
Office Action dated Sep. 15, 2020 for Japanese Application No. 2019-118784, 14 pages.
Office Action dated Sep. 17, 2020 for Canadian Application No. 2995315, 4 pages.
Office Action dated Sep. 17, 2020 for Canadian Application No. 2996342, 4 pages.
Office Action dated Dec. 19, 2019 for Taiwan Application No. 105127627, 14 pages.
Office Action dated Feb. 19, 2019 for Canadian Application No. 2995315, 4 pages.
Office Action dated Jun. 19, 2020 for Canadian Application No. 2995315, 4 pages.
Office Action dated Mar. 19, 2019 for Japanese Application No. 2018-506553, 8 pages.
Office Action dated Mar. 19, 2019 for Japanese Application No. 2018-506565, 4 pages.
Office Action dated Mar. 19, 2019 for Japanese Application No. 2018-506575, 10 pages.
Office Action dated Oct. 21, 2019 for Chinese Application No. 2016800498156, 20 pages.
Office Action dated Jun. 25, 2019 for Japanese Application No. 2018-519865, 3 pages.
Office Action dated Jun. 25, 2019 for Japanese Application No. 2018-521547, 4 pages.
Office Action dated Mar. 26, 2019 for Japanese Application No. 2018-506381, 22 pages.
Office Action dated Apr. 27, 2020 for the Brazilian Application No. 112017028539.8, 5 pages.
Office Action dated Mar. 28, 2019 for Canadian Application No. 3003514, 6 pages.
Office Action dated Aug. 29, 2019 for Korean Application No. 10-2018-7006009, 9 pages.
Office Action dated Oct. 29, 2019 for Japanese Application No. 2018-507624, 29 pages.
Office Action dated Sep. 29, 2020 for Japanese Application No. 2018-506563, 5 pages.
Office Action dated Dec. 3, 2019 for Japanese Application No. 2018-521547, 4 pages.
Office Action dated Dec. 3, 2019 for Japanese Application No. 2018-506381, 8 pages.
Office Action dated Jan. 31, 2019 for Korean Application No. 10-2018-7006009, 17 pages.
Office Action dated Nov. 4, 2019 for Chinese Application No. 201680049679.0, 12 pages.
Office Action dated Nov. 5, 2019 for Japanese Application No. 2018-506553, 12 pages.
Office Action dated Nov. 5, 2019 for Japanese Application No. 2018-506565, 12 pages.
Office Action dated Feb. 7, 2019 for Korean Application No. 10-2018-7006070, 9 pages.
Office Action dated May 7, 2019 for Japanese Application No. 2018-506563, 4 pages.
Office Action dated Feb. 8, 2019 for Korean Application No. 10-2018-7006077, 15 pages.
Office Action dated Jan. 8, 2019 for Japanese Application No. 2017-075527, 15 pages.

(56) References Cited

OTHER PUBLICATIONS

Office action dated Sep. 8, 2020 for Japanese Application No. 2018-507624, 7 pages.
Office Action dated Jun. 9, 2020 for Chinese Application No. 201680061969.7, 15 pages.
Partial European Search Report for Application No. 20205057.1, dated Apr. 29, 2021, 16 pages.
Partial European Search Report for Application No. 21170791.4, dated Nov. 22, 2021, 16 pages.
Physics., "Analysis Series of Typical Examples of College Entrance Examination," Editorial Board, Heilongjiang Science and Technology Press, Dec. 31, 1995, 47 pages.
"Polyetheretherketone—Online Catalog Source," Retrieved from www.goodfellow.com/A/Polyethertherketone.html, Jan. 17, 2020. 4 pages.
Rasidek N.A.M., et al., "Effect of Temperature on Rheology Behaviour of Banana Peel Pectin Extracted Using Hot Compressed Water," Jurnal Teknologi (Sciences & Engineering), vol. 80 (3), Apr. 1, 2018, pp. 97-103.
Search Report for Japanese Application No. 2020-521547, dated Jun. 14, 2019, 22 pages.
Search Report dated Jan. 17, 2013 for Great Britain Application No. 1216621.1, 6 pages.
Second Office Action dated Jan. 16, 2017 for Chinese Application No. 201380048636.7, 24 pages.
Shuisheng X., et al., "Semisolid processing technology," Jinshu Bangutai Jiagong Jishu, 2012, ISBN 978-7-5024-5935-2, 10 pages.
The Engineering Toolbox., "Specific Heats for Metals," retrieved from https://www.engineeringtoolbox.com/specific-heat-metals-d_152.html, 2003, 6 pages.
Todaka T., et al., "Low Curie Temperature Material for Induction Heating Self- Temperature Controlling System," Journal of Magnetism and Magnetic Materials, vol. 320 (20), Oct. 2008, pp. e702-e707.
Written Opinion of the International Preliminary Examining Authority for Application No. PCT/EP2016/075739, dated Sep. 28, 2017, 6 pages.
International Preliminary Report on Patentability for Application No. PCT/EP2015/064595, dated Oct. 25, 2016, 20 pages.
International Preliminary Report on Patentability for Application No. PCT/EP2018/057835 dated Oct. 10, 2019, 15 Pages.
International Preliminary Report on Patentability for Application No. PCT/GB2017/051139, dated Aug. 6, 2018, 7 pages.
International Preliminary Report on Patentability for Application No. PCT/US2012/066523, dated Jun. 4, 2015, 6 pages.
International Preliminary Report on Patentability for corresponding International Application No. PCT/GB2015/051213 dated Jul. 14, 2016, 20 pages.
International Preliminary Report on Patentability dated Aug. 13, 2013 for International Application No. PCT/AT2012/000017, 5 pages.
International Preliminary Report on Patentability, dated Apr. 22, 2014, for International Patent Application No. PCT/EP2012/070647, filed Oct. 18, 2012, 8 pages.
International Preliminary Report on Patentabilityfor Application No. PCT/EP2018/057834, dated Oct. 10, 2019, 13 Pages.
International Search Report and Written Opinion for Application No. PCT/AT2011/000123, dated Jul. 18, 2011, 15 pages (7 pages of English Translation and 8 pages of Official Copy).
International Search Report and Written Opinion for Application No. PCT/EP2012/066484, dated Jan. 9, 2013, 9 pages.
International Search Report and Written Opinion for Application No. PCT/EP2012/066485, dated Dec. 10, 2012, 10 pages.
International Search Report and Written Opinion for Application No. PCT/EP2012/066486, dated Jan. 14, 2013, 8 pages.
International Search Report and Written Opinion for Application No. PCT/EP2012/066523, dated Jan. 9, 2013, 9 pages.
International Search Report and Written Opinion for Application No. PCT/EP2012/066524, dated Jan. 9, 2013, 8 pages.
International Search Report and Written Opinion for Application No. PCT/EP2012/066525, dated Jan. 9, 2013, 10 pages.
International Search Report and Written Opinion for Application No. PCT/EP2013/057539, dated Feb. 11, 2014, 16 Pages.
International Search Report and Written Opinion for Application No. PCT/EP2014/063785, dated Oct. 30, 2014, 10 pages.
International Search Report and Written Opinion for Application No. PCT/EP2014/064365, dated Oct. 7, 2014, 11 pages.
International Search Report and Written Opinion for Application No. PCT/EP2014/072828, dated Jun. 16, 2015, 10 pages.
International Search Report and Written Opinion for Application No. PCT/EP2018/057834, dated Nov. 6, 2018, 20 Pages.
International Search Report and Written Opinion for Application No. PCT/GB2017/051139, dated Aug. 9, 2017, 14 pages.
International Search Report and Written Opinion for International Application No. PCT/EP2012/003103, dated Nov. 26, 2012, 6 pages.
International Search Report and Written Opinion for PCT/GB2014/051333 dated Jul. 17, 2014, 10 pages.
International Search Report and Written Opinion dated Feb. 6, 2013 for PCT/EP2012/070647 filed Oct. 18, 2012, 9 pages.
International Search Report and Written Opinion received for Application No. PCT/US2012/066523, dated May 29, 2013, 7 pages.
International Search Report and Written Opinion received for PCT Patent Application No. PCT/EP2020/056231, dated Jul. 15, 2020, 11 pages.
International Search Report and Written Opinion received for PCT Patent Application No. PCT/AT2012/000017, dated Jul. 3, 2012, 13 pages (6 pages of English Translation and 7 pages of Official Copy).
International Search Report and Written Opinion received for PCT Patent Application No. PCT/EP2018/057835, dated Nov. 6, 2018, 26 Pages.
International Search Report and Written Opinion, International Application No. PCT/GB2014/051332 dated Jul. 21, 2014, 8 pages.
International Search Report and Written Opinion, International Application No. PCT/GB2014/051334 dated Jul. 21, 2014, 8 pages.
International Search Report for corresponding International Application No. PCT/GB2015/051213 dated Jul. 16, 2015, 5 pages.
International Search Report for International Application No. PCT/AT2009/000413 dated Jan. 25, 2010, 3 pages.
International Search Report for International Application No. PCT/AT2009/000414 dated Jan. 26, 2010, 2 pages.
International Search Report received for PCT Application No. PCT/EP2015/064595, dated Jan. 5, 2016, 6 pages.
European Search Report for European Application No. 16166656 dated Oct. 11, 2016, 9 pages (Official Copy Only).
Examination Report for Indonesian Application No. P00201908524, dated Dec. 24, 2021, 5 pages (Official Copy Only).
Examination Report for Indonesian Application No. P00201908525, dated Dec. 24, 2021, 5 pages (Official Copy Only).
Examination Report received for New Zealand Patent Application No. 718007, dated Aug. 1, 2016, 4 pages.
Extended European Search Report for Application No. 18205608.5, dated Jul. 12, 2019, 7 pages (Official Copy Only).
Office Action for Brazilian Application No. 112018004103-3, dated Feb. 1, 2022, 4 pages (Official Copy Only).
Office Action for Brazilian Application No. 112018004110-6, dated Jan. 31, 2022, 4 pages (Official Copy Only).
Office Action for Chinese Application No. 201880023195.8, dated Jun. 21, 2022, 4 pages (Official Copy Only).
Office Action for Russian Application No. 2021112978, dated Oct. 28, 2021, 8 pages (Official Copy Only).
Office Action dated Sep. 5, 2022 for Russian Application No. 2019113858, 6 pages (Official Copy Only).
Office Action dated Jan. 25, 2019 for European Application No. 17189951.1, 4 pages (Official Copy Only).
Office Action received for Chinese Patent Application No. 201680049874.3, dated Mar. 20, 2023, 14 pages (Official Copy Only).
Office Action received for Russian Patent Application No. 2021126540, dated May 20, 2022, 8 pages (Official Copy Only).

(56) References Cited

OTHER PUBLICATIONS

Russian Office Action, Application No. 2015146847/12, dated Sep. 22, 2017, 11 pages (Official Copy Only).
Russian Office Action, Application No. 2014120213/12, dated Oct. 26, 2016, 7 pages (Official Copy Only).
Search Report dated Apr. 29, 2019 for Russian Application No. 2018137501, 12 pages (Official Copy Only).
Office Action dated Sep. 25, 2018 for European Application No. 12750765.5 filed Aug. 24, 2012, 22 pages.
Office Action dated Dec. 26, 2017 for Chinese Application No. 201480059966.0, 29 Pages (14 Pages of English Translation and 15 Pages of Official Copy).
Office Action dated Sep. 26, 2018 for European Application No. 12750765.5 filed Aug. 24, 2012, 67 pages.
Office Action dated Jul. 27, 2018 for Korean Application No. 10-2013-7033866, 22 pages (12 pages of English Translation and 10 pages of Official Copy).
Office Action dated Jun. 27, 2017 for Japanese Application No. 2016-527295, 8 pages (4 pages of English Translation and 4 pages of Official Copy).
Office Action dated May 27, 2020 for Russian Application No. 2019134684, 8 pages (2 pages of English Translation and 6 pages of Official Copy).
Office Action dated Aug. 28, 2019 for Indian Application No. 201647014549, 6 pages.
Office Action dated Jul. 28, 2017 for Korean Application No. 10-2016-7010831, 11 pages (6 pages of English Translation and 5 pages of Official copy).
Office Action dated Sep. 29, 2015 for Japanese Application No. 2015-506185 filed Apr. 11, 2013, 5 pages (2 pages of English Translation and 3 pages of Official Copy).
Office Action dated Aug. 3, 2018 for Chinese Patent Application No. 201580034981.4, 17 pages (10 pages of English Translation and 7 pages of Official Copy).
Office Action dated Mar. 31, 2015 for Japanese Application No. 2014-519585 filed Aug. 24, 2012, 8 pages (4 pages of English Translation and 4 pages of Official Copy).
Office Action dated May 4, 2018 for Chinese Application No. 201610086101.4, 7 Pages (4 Pages of English Translation and 3 Pages of Official Copy).
Office Action dated Apr. 7, 2015 for Japanese Application No. 2014-519586 filed Aug. 24, 2012, 10 pages (5 pages of English Translation and 5 pages of Official Copy).
Office Action dated May 9, 2017 for Chinese Application No. 201480037049.2, 28 pages (18 pages of English Translation and 10 pages of Official Copy).
Office Action mailed for Japanese Application No. 2017-017842, dated Dec. 12, 2017, 6 pages (3 pages of English Translation and 3 pages of Official Copy).
Office Action dated Oct. 20, 2022 for U.S. Appl. No. 16/948,553, filed Sep. 23, 2020, 9 pages.
Office Action received for Australian Patent Application No. 2020235037, dated May 26, 2022, 3 pages.
Office Action received for Chinese Patent Application No. 2013800472843, dated Nov. 13, 2017, 13 pages (7 pages of English Translation and 6 pages of Official Copy).
IPRP, International Application No. PCT/GB2014/051334 mailed Nov. 12, 2015, 7 pages.
Office Action received for Chinese Patent Application No. 201710412726.X, dated Apr. 24, 2019, 21 pages (13 pages of English Translation and 8 pages of Official Copy).
Office Action received for European Application No. 12750771.3, dated Jan. 11, 2019, 44 pages.
Office Action received for European Patent Application No. 12750771.3, dated Jan. 24, 2019, 40 pages.
Office Action received for European Patent Application No. 12750771.3, dated Jan. 25, 2019, 2 pages.
Office Action received for Japanese Patent Application No. 2016-522550, dated Jan. 31, 2017, 7 Pages (3 Pages of English Translation and 4 Pages of Official Copy).
Office Action received for Japanese Patent Application No. 2016-522550, dated Jul. 4, 2017, 7 Pages (3 Pages of English Translation and 4 Pages of Official Copy).
Office Action received for Japanese Patent Application No. 2016-522550, dated Nov. 14, 2017, 6 pages (3 pages of English Translation and 3 pages of Official Copy).
Office Action received for Japanese Patent Application No. 2016-575543, dated Dec. 4, 2018, 19 pages (9 pages of Official Copy and 10 pages of English Translation).
Office Action received for Korean Application No. 10-2017-7017430, dated Sep. 6, 2017, 9 pages (5 pages of English Translation and 4 pages of Official Copy).
Office Action received for Korean Patent Application No. 10-2017-7008071, dated Mar. 20, 2019, 2 pages (English Translation Only).
Office Action received for Korean Patent Application No. 10-2017-7008071, dated Mar. 20, 2019, 3 pages (English Translation Only).
Office Action received for Korean Patent Application No. 10-2017-7008071, dated May 11, 2018, 17 pages (9 pages of English Translation and 8 pages of Official Copy).
Office Action received for Korean Patent Application No. 10-2018-7017575, dated Jan. 23, 2019, 9 pages (5 pages of English Translation and 4 pages of Official Copy).
Office Action received for Korean Patent Application No. 10-2018-7019884, dated Apr. 5, 2019, 8 Pages (English Translation Only).
Office Action received for Russian Patent Application No. 2018101312, dated Jul. 4, 2018, 11 pages (3 pages of English Translation and 8 pages of Official copy).
IPRP, International Application No. PCT/GB2014/051332 mailed Nov. 12, 2015, 7 pages.
IPRP mailed Aug. 5, 2015 for International Application No. PCT/GB2014/051333, 12 pages.
Invitation to Pay Additional Fees with Partial International Search for Application No. PCT/EP2018/057834 dated Jul. 13, 2018, 18 Pages.
Russian Search Report for Russian Application No. 2015146843/12 (072088) date completed Apr. 24, 2017, 3 pages (English Translation Only).
Search Report dated Apr. 14, 2017 for Japanese Application No. 2016-134648, 31 pages (20 pages of English Translation and 11 pages of Official Copy).
Search Report dated Sep. 19, 2013 for Japanese Application No. 2011-532464, 116 pages (43 pages of English Translation and 73 pages of Official Copy).
Search Report dated Mar. 24, 2015 for Chinese Application No. 201280029767.6 filed Aug. 24, 2012, 6 pages (3 pages of English Translation and 3 pages of Official Copy).
Search Report dated Apr. 25, 2018 for Chinese Application No. 201610086101.4, 1 page (English Translation Only).
Search Report dated Aug. 25, 2015 for Japanese Application No. 2014-179732, 10 pages (5 pages of English Translation and 5 pages of Official Copy).
Search Report dated Oct. 25, 2017 for Japanese Application No. 2016-864977, 19 pages (10 pages of Official Copy and 9 pages of English Translation).
Invitation to Pay Additional Fees received for PCT Patent Application No. PCT/EP2018/057835, dated Jul. 17, 2018, 20 Pages.
Second Office Action dated Aug. 20, 2013 for Chinese Application No. 200980152395.4, 16 pages (10 pages of English Translation and 6 pages of Official Copy).
Summons to Attend Oral Proceedings pursuant to Rule 115(1) EPC mailed May 24, 2022 for European Application No. 18157257.9, 16 pages.
The opposition to petition not to grant of a patent for the Vietnam Application No. 1-2014-03877, mailed on Apr. 27, 2018, 35 pages.
“Thermofoil™ Heaters”, Minco Products Inc., Bulletin HS-202(D), Jul. 22, 2004, 60 pages.
Vietnam Opposition for Application No. PCT/EP2013/057539, mailed on Jun. 29, 2018, 29 pages (English Translation Only).
Vietnam Opposition for Application No. PCT/EP2013/057539, mailed on Apr. 27, 2018, 6 pages (3 pages of English Translation and 3 pages of Official Copy).
Written Opinion for Application No. PCT/GB2015/051213 dated Jul. 16, 2015, 9 pages.

(56) References Cited

OTHER PUBLICATIONS

Written Opinion of the International Preliminary Examining Authority Received for PCT Application No. PCT/ EP2015/064595, dated Jun. 13, 2016, 8 pages.
Written Opinion received for Application No. PCT/EP2012/066485, dated Oct. 15, 2013, 6 pages.
Written Opinion Received for PCT Application No. PCT/EP2015/064595, dated Jan. 5, 2016, 11 pages.
Abramov , et al., Application and File History for U.S. Appl. No. 15/991,512, filed May 29, 2018.
Abramov , et al., Application and File History for U.S. Appl. No. 14/343,368, filed Jun. 24, 2014.
Abramov , et al., Application and File History for U.S. Appl. No. 15/437,517, filed Feb. 21, 2017.
Abramov , et al., Application and File History for U.S. Appl. No. 15/437,522, filed Feb. 21, 2017.
Brereton , et al., Application and File History for U.S. Appl. No. 14/899,629, filed Dec. 18, 2015.
Buchberger , Application and File History for U.S. Appl. No. 13/583,381, filed Dec. 17, 2012.
Buchberger , Application and File History for U.S. Appl. No. 15/470,078, filed Mar. 27, 2017, 392 pages.
Buchberger , Application and File History for U.S. Appl. No. 15/470,089, filed Mar. 27, 2017.
Buchberger , Application and File History for U.S. Appl. No. 15/470,095, filed Mar. 27, 2017, 351 pages.
Collier, J. G., et al., “10.3 Mechanism of Evaporation and Condensation”, Convective Boiling and Condensation, Third Edition, Clarendon Press, 1994, 6 pages.
Concept Group , “Concept Group’s New Thermal Insulator Thinner Than Human Hair”, Jun. 29, 2011, 2 pages.
Concept Group , “Insulon® Thermal Barrier from Concept Group Blocks Heat with Hyper- Deep Vacuum™”, Dec. 15, 2011, 1 page.
Concept Group , “New Super Insulator form Concept Group Stops Heat Conduction in Tight Spaces”, https://www.businesswire.com/news/home/20110610006023/en/New-Super- Insulator-Concept-Group-Stops-Heat, 2011, 5 pages.
Davies , et al., “Metallic Foams: Their Production, Properties and Applications”, Journal of Materials Science, vol. 18, Part 7, 1983, pp. 1899-1911.
Diener Electronic , “Plasma Polymerization”, The Company Diener Electronic GmbH+Co. KG, www.plasma.de, Oct. 17, 2017, 19 Pages.
Dunn P and Reay D , “Heat Pipes”, 4th edition, ISBN 0080419038, 1994, 14 Pages.
Egoyants , et al., Application and File History for U.S. Appl. No. 14/127,138, filed Feb. 10, 2014.
Egoyants , et al., Application and File History for U.S. Appl. No. 14/127,144, filed Mar. 31, 2014.
Egoyants , et al., Application and File History for U.S. Appl. No. 14/127,148, filed Mar. 12, 2014.
Egoyants , et al., Application and File History for U.S. Appl. No. 14/127,879, filed May 9, 2014.
Egoyants , et al., Application and File History for U.S. Appl. No. 14/962,817, filed Dec. 8, 2015.
Egoyants , et al., Application and File History for U.S. Appl. No. 15/379,946, filed Dec. 15, 2016.
Harding , et al., Application and File History for U.S. Appl. No. 14/902,663, filed Jan. 4, 2016, 309 pages.
Hegbom, T , “Integrating Electrical Heating Elements in Appliance Design”, cited in EPO Opposition File Wrapper for EP2871983, resulting in interlocutory decision dated Aug. 7, 2019, 1997, 4 pages.
Kynol , “Standard Specifications of Kynol Activated Carbon Fiber Products”, published by Kynol., Sep. 19, 2013, 2 Pages.
Merriam-Webster , “Definition of Film”, Available at <https://www.merriam-webster.com/dictionary/Film>, Sep. 17, 2019, 13 pages.
Patio Kits Direct , “Insulated Roof Panels”, DIY Alumawood Patio Cover Kits, available at https://www.patiokitsdirect.com/about-insulation, Sep. 20, 2018, 2 pages.
Rudolph, G , “The Influence of CO2 on the Sensory Characteristics of the Favor-System”, BAT Cigarettenfabriken GmbH, http://legacy.library.ucsf.edu/tid/sla51f00, 1987, 24 pages.
Saleem , et al., Application and File History for U.S. Appl. No. 14/382,198, filed Aug. 29, 2014.
Vasiliev , et al., Application and File History for U.S. Appl. No. 14/127,133, filed Jul. 15, 2014.
Virginia, R. , “A Summary of Findings and Recommendations for the Flexible Heater”, Sep. 19, 1990, 8 pages.
Warrier , et al., “Effect of the Porous Structure of Graphite on Atomic Hydrogen Diffusion and Inventory”, Nuclear Fusion, vol. 47, 2007, pp. 1656-1663.
“A Vacuum Insulation that is Ultrathin”, Chemical Engineering, Aug. 1, 2011, 5 pages.
Brief Communication For European Application No. 12750765.5, dated Aug. 31, 2021, 16 pages.
Chinese First Office Action for Chinese Application No. 200980152395.4 dated Dec. 3, 2012, 16 pages (10 pages of English Translation and 6 pages of Official Copy).
Chinese Office Action for Chinese Application No. 201480024978.X dated Jan. 18, 2017, 8 pages (5 pages of English Translation and 3 pages of Official Copy).
Chinese Office Action, Application No. 201480024988.3, dated Dec. 30, 2016, 26 pages (English Translation Only).
Chinese Office Action, Application No. 201480024988.3, dated Sep. 11, 2017, 10 pages (3 pages of English Translation and 7 pages of Official Copy).
Chinese Office Action, Application No. 201580022356.8, dated Jul. 18, 2018, 15 pages (7 pages of English Translation and 8 pages of Official Copy).
Chinese Office Action, Application No. 201610371843.1, dated Sep. 30, 2018, 8 pages (5 pages of English Translation and 3 pages of Official Copy).
Communication of a Notice of Opposition, dated Nov. 25, 2020, for European Patent Application No. 13716763.1, 26 pages.
Communication pursuant to Article 94(3) EPC for Application No. 16766233.7 dated Mar. 7, 2022, 5 pages.
Communication Pursuant to Article 94(3) EPC for Application No. 16766234.5 dated Mar. 7, 2022, 15 pages.
Communication pursuant to Article 94(3) EPC for Application No. 20202673.8, dated Aug. 12, 2022, 5 pages.
Communication pursuant to Article 94(3) EPC for Application No. 22155465.2, dated Aug. 5, 2022, 7 pages.
“Company Filtrona Richmond Inc.”, http://www.filtronaporoustechnologies.com, Nov. 19, 2018, 1 Page.
Decision of Rejection dated Apr. 15, 2022 for Chinese Application No. 20168009479.5, 7 pages (English Translation Only).
Decision to Grant a Patent received for Japanese Application No. 2015-506185 filed Apr. 11, 2013, dated Nov. 15, 2016, 5 pages (2 pages of English Translation and 3 pages of Official Copy).
Decision to Grant, Russian Application No. 2011120430, dated Apr. 1, 2014, 16 pages (6 pages of English Translation and 10 pages of Official Copy).
European Extended Search Report for European Application No. 201576220, dated May 28, 2020, 12 pages.
European Extended Search Report, Application No. 17189951.1, dated Jan. 4, 2018, 11 pages (3 pages of English Translation and 8 pages of Official copy).
European Search Report for European Application No. 15178588 dated Apr. 14, 2016, 2 pages.
Notice of Opposition Letter from EPO. Opposition against: EP2358418 dated Mar. 1, 2017, 60 pages.
European Search Report for European Application No. 22155465.2, dated Jul. 25, 2022, 4 pages.
Examination Report for Canadian Application No. 2,845,754, dated Aug. 19, 2021, 6 pages.
Examination Report for Canadian Application No. 2,845,754, dated Nov. 4, 2020, 5 pages.
Examination Report for Indian Application No. 201947043640, dated Aug. 11, 2020, 7 Pages.
Notice of Opposition dated Mar. 7, 2017 for European Application No. 12750770.5, 22 pages.

(56) References Cited

OTHER PUBLICATIONS

Korean Office Action Application No. 1020197037986, dated Feb. 6, 2020, 11 pages (5 pages of English Translation and 6 pages of Official copy).
Examination Report No. 1 for Australian Application No. 2020294182, dated Mar. 5, 2022, 3 Pages.
Examination Report received for Australian Patent Application No. 2016204192, dated Feb. 21, 2018, 7 pages.
"Kapton (Polyimide) Flexible Heaters", National Plastic Heater, Sensor and Control Inc., retrieved from https://www.kapton-silicone-flexible-heaters.com/products/kapton_polyimide_flexible_heaters.html on Feb. 23, 2018, 2011, 2 pages.
Examination Report received for Philippines Patent Application No. 1/2016/500805, dated Jan. 9, 2019, 6 pages.
Japanese Reasons for Rejection for Japanese Application No. 2016134648 dated May 23, 2017, 18 pages (9 pages of English Translation and 9 pages of Official Copy).
Extended European Search Report for Application No. 20205071.2, dated Jul. 16, 2021, 8 pages.
Extended European Search Report for Application No. 21170791.4, dated Jun. 28, 2022, 15 pages.
Extended European Search Report for Application No. 21171022.3, dated Dec. 3, 2021, 8 pages.
Extended European Search Report For European Application No. 20206770.8, dated Mar. 3, 2021, 10 pages.
Extended European Search Report received for Application No. 15200661.5, dated May 18, 2016, 6 pages.
Extended European Search Report received for Application No. 18157257.9, dated Jun. 28, 2018, 7 pages.
Extended Search Report received for European Patent Application No. 22189790.3, dated Jan. 24, 2023, 11 pages.
First Office Action dated Jun. 15, 2015 and Search Report dated Jun. 2, 2015 for Chinese Application No. 201280029784.X, filed Aug. 24, 2012, 27 pages (16 pages of English Translation and 11 pages of Official Copy).
Intemational Search Report for Application No. PCT/US2019/049076, dated Dec. 18, 2019, 4 Pages.
International Preliminary Report on Patentability for Application No. PCT/EP2012/066484, dated Mar. 20, 2014, 7 pages.
International Preliminary Report on Patentability for Application No. PCT/EP2012/066485, dated Dec. 20, 2013, 12 pages.
International Preliminary Report on Patentability for Application No. PCT/EP2012/066486, dated Oct. 22, 2013, 10 pages.
International Preliminary Report on Patentability for Application No. PCT/EP2012/066523, dated Nov. 4, 2013, 9 pages.
International Preliminary Report on Patentability for Application No. PCT/EP2012/066524, dated Oct. 17, 2013, 11 pages.
International Preliminary Report on Patentability for Application No. PCT/EP2012/066525, dated Mar. 20, 2014, 8 pages.
International Preliminary Report on Patentability for Application No. PCT/EP2013/057539, dated Nov. 6, 2014, 10 pages.
International Preliminary Report on Patentability for Application No. PCT/EP2014/063785, dated Jun. 1, 2015, 12 pages.
International Preliminary Report on Patentability for Application No. PCT/EP2014/072828, dated May 12, 2016, 7 pages.
Notice of Opposition dated Sep. 20, 2021 for European Application No. 18157257.9 (EP3354144), 31 pages.
Notice of Reasons for Refusal for Japanese Application No. 2020-175447, dated Aug. 2, 2022, 23 pages (12 pages of English Translation and 11 pages of Official Copy).
Notice of Reasons for Refusal received for Japanese Patent Application No. 2020-181532, dated Jan. 17, 2023, 8 pages (4 pages of English Translation and 4 pages of Official Copy).
Notice of Reasons for Rejection for Japanese Application No. 2020-181532, dated Jun. 21, 2022, 6 pages (3 pages of English Translation and 3 pages of Official Copy).
Notice of Reasons for Rejection for Japanese Application No. 2020-181533, dated Apr. 26, 2022, 3 pages (English Translation Only).
Notice of Reasons for Rejection for Japanese Application No. 2021-078359, dated Jun. 28, 2022, 6 pages (3 pages of English Translation and 3 pages of Official Copy).
Notice of Reasons for Rejection dated Apr. 26, 2022 for Japanese Application No. 2022-013252, 4 pages (English Translation Only).
Notification to Grant Patent Right for Invention dated Oct. 25, 2018 for Chinese Application No. 201610086101.4, 2 pages (English Translation Only).
Office Action and Search Report dated Apr. 27, 2015 for Chinese Application No. 201280030681.5, filed Aug. 24, 2012, 25 pages (16 pages of English Translation and 9 pages of Official Copy).
Office Action and Search Report dated Feb. 28, 2019 for Japanese Application No. 2018-088088, 25 pages (13 pages of English Translation and 12 pages of Official Copy).
Office Action and Search Report received for Russian Patent Application No. 2020135861, dated Apr. 13, 2021, 8 pages (2 pages of English Translation and 6 pages of Official Copy).
Office Action dated Jun. 16, 2020 for Japanese Application No. 2019-065344, 10 pages (5 pages of English Translation and 5 pages of Official Copy).
Japanese Office Action, Application No. 2016-564977, dated Dec. 5, 2017, 6 pages (3 pages of English Translation and 3 pages of Official Copy).
Japanese Notice of Reasons for Rejection dated Sep. 8, 2015 for Japanese Application No. 2014179732, 5 pages (2 pages of English Translation and 3 pages of Official Copy).
Office Action for Canadian Application No. 3,057,903, dated Dec. 15, 2020, 6 Pages.
Office Action for Canadian Application No. 3,057,903, dated Aug. 30, 2021, 4 Pages.
Office Action for Canadian Application No. 3,057,905, dated Jan. 20, 2021, 6 Pages.
Office Action for Chinese Application No. 201811073829.9, dated Jan. 25, 2022, 9 pages (2 pages of English Translation and 7 pages of Official Copy).
Office Action for Chinese Application No. 201811073829.9, dated May 8, 2021, 25 pages (10 pages of English Translation and 15 pages of Official Copy).
Office Action for Chinese Application No. 201811073829.9, dated Sep. 15, 2021, 11 pages (5 pages of English Translation and 6 pages of Official copy).
Japanese Notice of Reasons for Rejection dated Oct. 7, 2013 for Japanese Application No. 2011532464, 6 pages (3 pages of English Translation and 3 pages of Official Copy).
Office Action for Chinese Application No. 2018800231958, dated Apr. 21, 2021, 17 pages (9 pages of English Translation and 8 pages of Official Copy).
Office Action for Chinese Application No. 2018800231958, dated Dec. 17, 2021, 10 pages (4 pages of English Translation and 6 pages of Official Copy).
Office Action for Japanese Application No. 2019-551462 dated Dec. 15, 2020, 4 pages (English Translation Only).
Office Action for Japanese Application No. 2019-551471 dated Dec. 15, 2020, 8 pages (4 pages of English Translation and 4 pages of Official Copy).
Office Action for Japanese application No. 2019-551471, dated Apr. 20, 2021, 2 pages (English Translation Only).
Office Action for Japanese Application No. 2020-121066, dated Jun. 22, 2021, 6 pages (3 pages of English Translation and 3 pages of Official Copy).
Office action for Japanese Application No. 2020-182327, dated Nov. 1, 2022, 4 pages (2 pages of English Translation and 2 pages of Official Copy).
Office action for Japanese Application No. 2021-074263, dated Jun. 14, 2022, 14 pages (7 pages of English Translation and 7 pages of Official Copy).
Office action for Japanese Application No. 2021-074266, dated Jul. 26, 2022, 8 pages (4 pages of English Translation and 4 pages of Official Copy).
Office Action for Korean Application No. 10-2019-7032076, dated May 25, 2021, 4 pages (English Translation Only).

(56) References Cited

OTHER PUBLICATIONS

Office action for Korean Application No. 10-2019-7038229, dated Jul. 19, 2022, 15 pages (8 pages of English Translation and 7 pages of Official Copy).
Office Action for Korean Application No. 10-2020-7017740, dated Feb. 8, 2022, 14 pages (English Translation Only).
Office Action for Korean Application No. 10-2020-7017746, dated Feb. 10, 2022, 25 pages (14 pages of English Translation and 11 pages of Official Copy).
Office Action for Korean Application No. 10-2020-7031372, dated Dec. 9, 2020, 13 pages (English Translation Only).
Office Action for Korean Application No. 10-2021-7013743, dated Nov. 22, 2021, 17 pages (9 pages of English Translation and 8 pages of Official Copy).
Office Action for Malaysian Application No. PI2018001351, dated Sep. 30, 2021, 4 pages (English Translation Only).
Japanese Notice of Reasons for Rejection for Japanese Application No. 2015-137361 mailing dated May 31, 2016, 6 pages (3 pages of English Translation and 3 pages of Official Copy).
Japanese Decision to Grant, application No. 2011-532464 dated Aug. 5, 2014, 6 pages (3 pages of English Translation and 3 pages of Official Copy).
Office Action dated Sep. 6, 2017 for Korean Application No. 10-2017-7017425, 9 pages (5 pages of English Translation and 4 pages of Official Copy).
Office Action dated Jul. 8, 2016 for Chinese Application No. 201380021387.2, filed Apr. 11, 2011, 12 pages (7 pages of English Translation and 5 pages of Official Copy).
Office Action dated May 10, 2020 for Brazilian Application No. BR112014004818-5, 6 pages (2 pages of English Translation and 4 pages of Official Copy).
Office Action dated May 12, 2017 for Russian Application No. 2016103729, filed Jul. 4, 2014, 10 pages (3 pages of English Translation and 7 pages of Official Copy).
Office Action dated Apr. 14, 2021 for Korean Application No. 10-2020-7036811, 10 pages (5 pages of English Translation and 5 pages of Official Copy).
Office Action dated May 15, 2020 for the Brazilian Application No. 112018004103.3.
Office Action dated Feb. 16, 2022 for Japanese Application No. 2019-118784, 28 pages (English Translation Only).
Office Action dated Aug. 17, 2016 for Korean Application No. 10-2014-7032958, 13 pages (7 pages of English Translation and 6 pages of Official Copy).
Office Action dated Apr. 24, 2019 for Chinese Application No. 201710413187.1, 16 pages (9 pages of English Translation and 7 pages of Official Copy).
Japanese Decision to Grant, Application No. 2016-134648, dated May 22, 2018, 5 pages (2 pages of English Translation and 3 pages of Official Copy).
Office Action dated Mar. 25, 2019 for Chinese Application No. 201610804046.8, 17 pages (English Translation Only).
"Notice of Reason for Rejection received for Japanese Patent Application No. 2022-132571, mailed on Oct. 24, 2023", 6 pages (English Translation Only).
"Notice of Reasons for Rejection received for Japanese Patent Application No. 2022-140921, mailed on Aug. 29, 2023", 11 pages (5 pages of English Translation and 6 pages of Official copy).
"Office Action received for Brazilian Patent Application No. 112018004110-6, mailed on Jun. 1, 2023", 8 pages (4 pages of English Translation and 4 pages of Official Copy).
"Office Action received for European Patent Application No. 23164488.1, mailed on Sep. 26, 2023", 6 pages.
"Office Action received for Korean Patent Application No. 10-2021-7020687, mailed on Sep. 14, 2023", 10 pages (5 pages of English Translation and 5 pages of Official Copy).
"Office Action received for Malaysian Patent Application No. PI2018700425, mailed on Sep. 27, 2023", 2 pages.
"Reason for Refusal for Korean Application No. 10-2021-7020659, mailed Sep. 22, 2023", 12 pages (6 pages of English Translation and 6 pages of Official Copy).
"Reason for Refusal for Korean Application No. 10-2021-7020661, mailed Sep. 22, 2023", 11 pages (6 pages of English Translation and 5 pages of Official Copy).
"Reasons for Rejection received for Korean Patent Application No. 10-2021-7020159, mailed on Octobber 05, 2023", 25 pages (13 pages of English Translation and 12 pages of Official Copy).
"Reasons for Rejection received for Korean Patent Application No. 10-2021-7020688, mailed on Sep. 14, 2023", 9 pages (4 pages of English Translation and 5 pages of Official Copy).
"Search Report received for European Patent Application No. 23164488.1, mailed on Sep. 14, 2023", 5 pages.
Chalapud, Mayra C. , "Pectin Films with Recovered Sunflower Waves Produced by Electrospraying", Membranes, vol. 12, 560, May 28, 2022, 17 pages.
EXCELLUP , "Solid State", Available at <https://www.excellup.com/class_12/chemistry_12/SolidState4.aspx# :-: text= (a)%20Conductor%3A%20Solids%20having, considered%20as%20very%20good%20conductor>, 2023, 6 pages.

* cited by examiner

APPARATUS FOR HEATING SMOKABLE MATERIAL

PRIORITY CLAIM

The present application is Continuation of U.S. application Ser. No. 15/772,382, filed Apr. 30, 2018, which is a National Phase entry of PCT Application No. PCT/EP2016/075734, filed Oct. 26, 2016, which claims priority from U.S. patent application Ser. No. 14/927,529, filed Oct. 30, 2015, each of which is hereby fully incorporated herein by reference.

TECHNICAL FIELD

The present disclosure relates to apparatus for heating smokable material, such as tobacco, to volatilize at least one component of the smokable material, and to systems comprising such apparatus and articles comprising such smokable material and for use with such apparatus.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an apparatus for heating smokable material to volatilize at least one component of the smokable material, the apparatus comprising: a heating zone for receiving an article, the article comprising smokable material and heating material that is heatable by penetration with a varying magnetic field to heat the smokable material; and a magnetic field generator for generating a varying magnetic field that penetrates the heating zone, the magnetic field generator comprising a magnetically permeable core and a coil; wherein the core comprises a magnetically permeable first portion and magnetically permeable first and second arms extending from the first portion, wherein the coil is wound around the first portion of the core, and wherein the first and second arms of the core are on different sides of the heating zone.

In an exemplary embodiment, the first and second arms of the core have respective free ends on different sides of the heating zone.

In an exemplary embodiment, the first and second arms of the core are on opposite sides of the heating zone.

In an exemplary embodiment, the first and second arms of the core have respective free ends on opposite sides of the heating zone.

In an exemplary embodiment, the respective free ends of the first and second arms of the core face each other through the heating zone.

In an exemplary embodiment, the heating zone is elongate, and each of the first and second arms of the core is elongate in a direction parallel to a longitudinal axis of the heating zone.

In an exemplary embodiment, the first and second arms of the core extend from opposite ends of the first portion of the core.

In an exemplary embodiment, the core comprises third and fourth arms extending from the first portion, and the third and fourth arms of the core are on opposite sides of the heating zone.

In an exemplary embodiment, the first and third arms of the core extend from a first end of the first portion of the core, and the second and fourth arms of the core extend from an opposite second end of the first portion of the core.

In an exemplary embodiment, the first, second, third and fourth arms connect the first portion of the core to a second portion of the core, and wherein the second portion of the core is on an opposite side of the heating zone from the first portion of the core.

In an exemplary embodiment, the magnetic field generator comprises a second coil wound around the second portion of the core.

In an exemplary embodiment, the heating zone has an open first end through which the article is insertable into the heating zone, a second end opposite the first end, and one or more sides connecting the first and second ends; and the first arm of the core is at the side, or one of the sides, of the heating zone, and the second arm of the core is at the second end of the heating zone.

In an exemplary embodiment, the first and second arms of the core have respective free ends; and the free end of the first arm of the core is at the side, or one of the sides, of the heating zone, and the free end of the second arm of the core is at the second end of the heating zone.

In an exemplary embodiment, the respective free ends of the first and second arms of the core face the heating zone.

In an exemplary embodiment, the magnetic field generator comprises a magnetically permeable second core; and the second core comprises a magnetically permeable first portion and magnetically permeable first and second arms extending from the first portion, the second coil is wound around the first portion of the second core, and the first and second arms of the second core have respective free ends that face the heating zone.

In an exemplary embodiment, the core comprises, or is composed of, ferrite.

In an exemplary embodiment, the first portion of the core is unitary with each of the first and second arms of the core.

In an exemplary embodiment, the heating zone is a recess in the apparatus. In an exemplary embodiment, the heating zone is a recess in the core.

In an exemplary embodiment, the core is comprises, or is composed of, ferrite.

In an exemplary embodiment, the core comprises plural layers of electrically-conductive material that are isolated from one another by non-electrically-conductive material.

In an exemplary embodiment, the coil extends along an axis that is perpendicular to a longitudinal axis of the heating zone.

In an exemplary embodiment, the coil extends along an axis that is parallel to a longitudinal axis of the heating zone.

In an exemplary embodiment, the apparatus is for heating smokable material to volatilize at least one component of the smokable material without burning the smokable material.

A second aspect of the present disclosure provides a system, comprising: an article comprising smokable material and a heater, wherein the heater comprises heating material that is heatable by penetration with a varying magnetic field to heat the smokable material; and apparatus for heating the smokable material to volatilize at least one component of the smokable material, the apparatus comprising: a heating zone for receiving the article; and a magnetic field generator for generating a varying magnetic field that penetrates the heater when the article is in the heating zone, the magnetic field generator comprising a magnetically permeable core and a coil; wherein the core comprises a magnetically permeable first portion and magnetically permeable first and second arms extending from the first portion, wherein the coil is wound around the first portion of the core, and wherein the first and second arms of the core are on different sides of the heating zone.

In an exemplary embodiment, the magnetic field generator comprises a magnetically permeable second core and a second coil; and the second core comprises a magnetically permeable first portion and magnetically permeable first and second arms extending from the first portion, the second coil is wound around the first portion of the second core, and the first and second arms of the second core have respective free ends that face the heating zone.

In an exemplary embodiment, the article comprises a second heater comprising heating material that is heatable by penetration with a varying magnetic field to heat the smokable material, and the respective free ends of the first and second arms of the second core face the second heater when the article is in the heating zone.

In an exemplary embodiment, the smokable material of the article is located between the heater and the second heater.

In an exemplary embodiment, the smokable material comprises tobacco and/or one or more humectants.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, the article of the system is the article of the first aspect of the present disclosure. The article of the system may have any one or more of the features discussed above as being present in respective exemplary embodiments of the article of the first aspect of the present disclosure.

BRIEF DESCRIPTION OF THE DRAWINGS

Embodiments of the disclosure will now be described, by way of example only, with reference to the accompanying drawings, in which.

DETAILED DESCRIPTION

Figure 1:
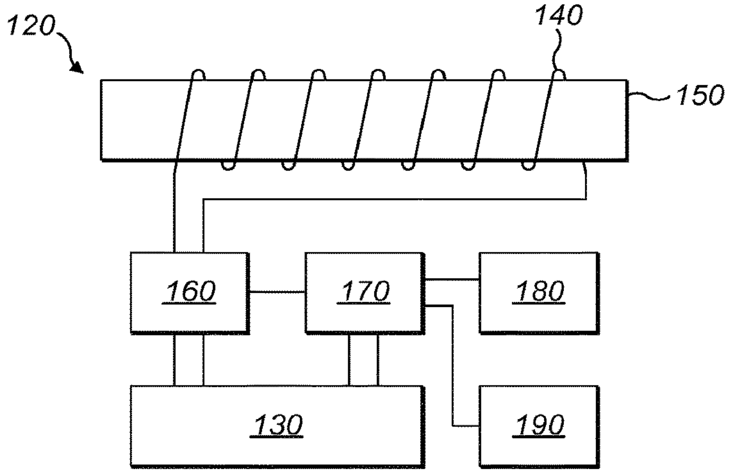
FIG. 1 shows a schematic view of an example of a magnetic field generator of apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

As used herein, the terms "flavor" and "flavorant" refer to materials which, where local regulations permit, may be used to create a desired taste or aroma in a product for adult consumers. They may include extracts (e.g., licorice, *hydrangea*, Japanese white bark *magnolia* leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, *cassia*, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Referring to FIG. 1, there is shown a schematic view of an example of a magnetic field generator 120 of apparatus for heating smokable material to volatilize at least one component of the smokable material, in accordance with an embodiment of the present disclosure. The magnetic field generator 120 shown in FIG. 1 is included in the respective apparatuses 100, 200, 300 described below with reference to FIGS. 2 to 4, respectively. However, in other embodiments, the apparatus 100, 200, 300 may comprise a different magnetic field generator to that shown in FIG. 1.

In this embodiment, the magnetic field generator 120 comprises an electrical power source 130, a coil 140, a magnetically permeable core 150, a device 160 for passing a varying electrical current, such as an alternating current, through the coil 140, a controller 170, a user interface 180 for user-operation of the controller 170, and a temperature sensor 190.

In this embodiment, the electrical power source 130 is a rechargeable battery. In other embodiments, the electrical power source 130 may be other than a rechargeable battery, such as a non-rechargeable battery, a capacitor, a battery-capacitor hybrid, or a connection to a mains electricity supply.

The coil 140 may take any suitable form. In this embodiment, the coil 140 is a helical coil of electrically-conductive material, such as copper. The coil 140 is wound or wrapped around a portion of the magnetically permeable core 150.

The magnetically permeable core 150 concentrates the magnetic flux produced by the coil 140 in use and makes a more powerful magnetic field. Furthermore, the magnetically permeable core 150 helps to direct the magnetic flux to its intended target. The intended target in the embodiments discussed below is a heater 20, 22 of an article 1, 2, 3. The heater 20, 22 comprises heating material that is heatable by penetration with a varying magnetic field. Example such heating materials are discussed below. In the embodiments described below, the heater 20, 22 is for heating smokable material 10 of the article 1, 2, 3. In some embodiments, the coil 140 may be wound around only a portion (i.e. not all) of the magnetically permeable core 150.

The magnetically permeable core 150 preferably has high magnetic permeability and low electrical conductivity. The latter helps prevent the generation of eddy currents in the magnetically permeable core 150 in use, which helps to prevent the magnetically permeable core 150 becoming heated in use.

In each of the embodiments described herein with reference to FIGS. 1 to 4, the magnetically permeable core 150 comprises, or is composed of, ferrite. The ferrite may, for example, contain iron oxide combined with nickel and/or zinc and/or manganese. The ferrite may have a low coercivity and be considered a “soft ferrite”, or have a high coercivity and be considered a “hard ferrite”. Example usable soft ferrites are manganese-zinc ferrite, with the formula $Mn_aZn_{(1-a)}Fe_2O_4$, and nickel-zinc ferrite, with the formula $Ni_aZn_{(1-a)}Fe_2O_4$. However, in respective variations to these embodiments, the magnetically permeable core 150 may be made of a different material or materials. For example, in some embodiments, the magnetically permeable core 150 may comprise plural layers of electrically-conductive material that are isolated from one another by non-electrically-conductive material. The magnetically permeable core 150 may have dozens, or even hundreds, of layers of electrically-conductive material that are isolated from one another by non-electrically-conductive material.

In this embodiment, the device 160 for passing a varying current through the coil 140 is electrically connected between the electrical power source 130 and the coil 140. In this embodiment, the controller 170 also is electrically connected to the electrical power source 130, and is communicatively connected to the device 160 to control the device 160. More specifically, in this embodiment, the controller 170 is for controlling the device 160, so as to control the supply of electrical power from the electrical power source 130 to the coil 140. In this embodiment, the controller 170 comprises an integrated circuit (IC), such as an IC on a printed circuit board (PCB). In other embodiments, the controller 170 may take a different form. In some embodiments, the apparatus may have a single electrical or electronic component comprising the device 160 and the controller 170. The controller 170 is operated in this embodiment by user-operation of the user interface 180. The user interface 180 may be located at the exterior of the apparatus 100, 200, 300 into which the magnetic field generator 120 is incorporated. The user interface 180 may comprise a push-button, a toggle switch, a dial, a touch-screen, or the like. In other embodiments, the user interface 180 may be remote and connected to the rest of the apparatus wirelessly, such as via Bluetooth.

In this embodiment, operation of the user interface 180 by a user causes the controller 170 to cause the device 160 to cause an alternating electrical current to pass through the coil 140, so as to cause the coil 140 to generate an alternating magnetic field. In the embodiments described below with reference to FIGS. 2 to 4, when the article 1, 2, 3 is located in the heating zone 110, the coil 140 and the heater 20 of the article 1, 2, 3 are suitably relatively positioned so that the alternating magnetic field produced by the coil 140 penetrates the heating material of the heater 20 of the article 1, 2, 3. As further described herein, the magnetically permeable core 150 helps to direct the magnetic field so that the magnetic field penetrates the heating material of the heater 20 of the article 1, 2, 3. When the heating material of the heater 20 of the article 1, 2, 3 is an electrically-conductive material, this may cause the generation of one or more eddy currents in the heating material. The flow of eddy currents in the heating material against the electrical resistance of the heating material causes the heating material to be heated by Joule heating. As mentioned above, when the heating material is made of a magnetic material, the orientation of magnetic dipoles in the heating material changes with the changing applied magnetic field, which causes heat to be generated in the heating material.

In this embodiment, the temperature sensor 190 is for sensing a temperature of the heating zone 110 in use. The temperature sensor 190 is communicatively connected to the controller 170, so that the controller 170 is able to monitor the temperature of the heating zone 110. In some embodiments, the temperature sensor 190 may be arranged to take an optical temperature measurement of the heating zone 110 or article 1, 2, 3. In some embodiments, the article 1, 2, 3 may comprise a temperature detector, such as a resistance temperature detector (RTD), for detecting a temperature of the article 1, 2, 3. The article 1, 2, 3 may further comprise one or more terminals connected, such as electrically-connected, to the temperature detector. The terminal(s) may be for making connection, such as electrical connection, with a temperature monitor of the magnetic field generator when the article 1, 2, 3 is in the heating zone 111. The controller 170 may comprise the temperature monitor. The temperature monitor of the apparatus 100 may thus be able to determine a temperature of the article 1, 2, 3 during use of the article 1, 2, 3 with the apparatus 100, 200, 300.

In some embodiments, by providing that the heating material of the heater 20 of the article 1, 2, 3 has a suitable resistance, the response of the heating material to a change in temperature could be sufficient to give information regarding temperature inside the article 1, 2, 3. The temperature sensor 190 may then comprise a probe for analyzing the heating material.

On the basis of one or more signals received from the temperature sensor 190 or temperature detector, the controller 170 may cause the device 160 to adjust a characteristic of the varying or alternating electrical current passed through the coil 140 as necessary, in order to ensure that the temperature of the heating zone 110 remains within a predetermined temperature range. The characteristic may be, for example, amplitude or frequency. Within the predetermined temperature range, in use the smokable material 10 within an article 1, 2, 3 located in the heating zone 110 is heated sufficiently to volatilize at least one component of the smokable material 10 without combusting the smokable material 10. Accordingly, the controller 170, and the apparatus 100, 200, 300 as a whole, is arranged to heat the smokable material 10 to volatilize the at least one component of the smokable material 10 without combusting the smokable material 10. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range.

In some embodiments, the temperature sensor 190 may be omitted.

Figure 2:
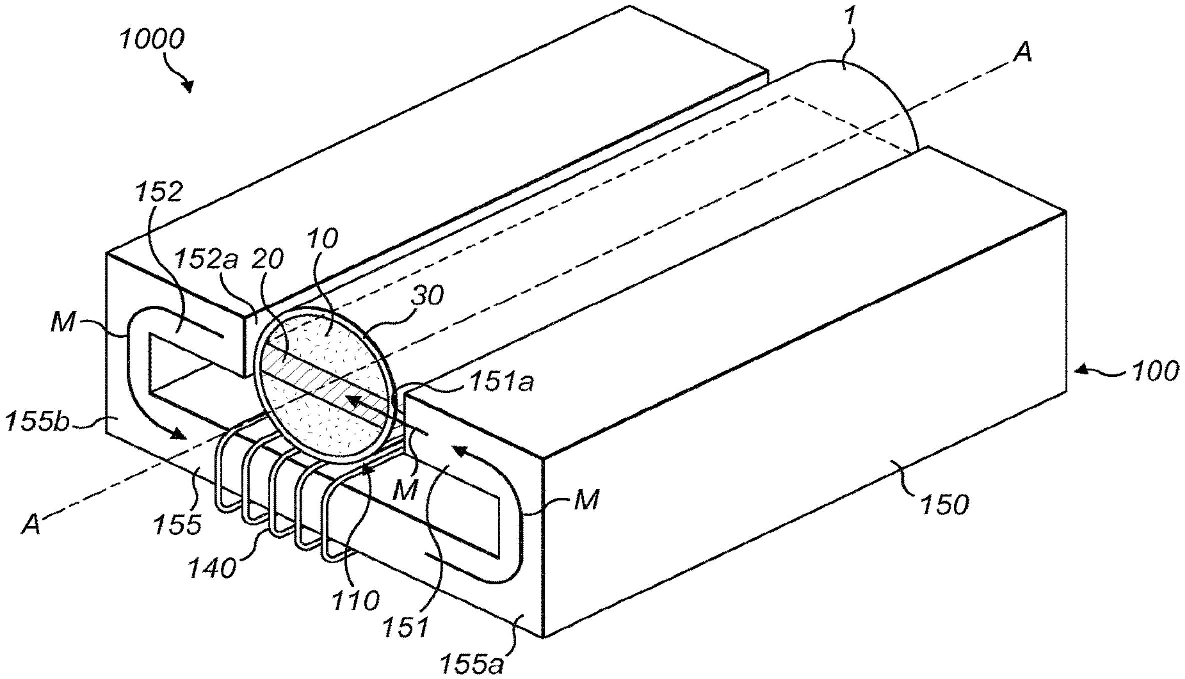
FIG. 2 shows a schematic perspective view of an example of a system, the system comprising an article comprising smokable material, and apparatus for heating the smokable material to volatilize at least one component of the smokable material.

Referring to FIG. 2, there is shown a schematic perspective view of an example of a system according to an embodiment of the present disclosure. The system 1000 comprises an article 1 comprising smokable material 10, and apparatus 100 for heating the smokable material 10 to volatilize at least one component of the smokable material 10. In this embodiment, the apparatus 100 is for heating the smokable material 10 to volatilize at least one component of the smokable material 10 without burning the smokable material 10.

In this embodiment, the article 1 of the system 1000 comprises a heater 20 comprising heating material. The heating material is heatable by penetration with a varying magnetic field. The heater 20 is within the smokable material 10. In other embodiments, the smokable material 10 may be on only one side of the heater 20. The article 1 also comprises a cover 30 that encircles the smokable material 10 and the heater 20 to help maintain the relative positions of the smokable material 10 and the heater 20. The cover 30 may thermally insulate the interior of the cover 30 from the exterior of the cover 30. The cover 30 may electrically insulate the heater 20 from the core 150. The cover 30 may be made of any suitable material, such as paper, card, a plastics material, or the like. In other embodiments, the cover 30 may take a different form or be omitted.

In this embodiment, the article 1 is elongate and cylindrical with a substantially circular cross section in a plane normal to a longitudinal axis of the article 1. However, in other embodiments, the article 1 may have a cross section other than circular and/or not be elongate and/or not be cylindrical. The article 1 may have proportions approximating those of a cigarette.

In this embodiment, the apparatus 100 comprises a heating zone 110 for receiving the article 1, and the magnetic field generator 120 shown schematically in FIG. 1. In this embodiment, the heating zone 110 is a recess in the apparatus 100. Moreover, in this embodiment, the heating zone 110 is a recess in the core 150. More specifically, in this embodiment, the recess 110 is elongate and has a longitudinal axis A-A. Furthermore, although not expressly shown in FIG. 2, in this embodiment the recess 110 is cylindrical with a substantially circular cross section in a plane normal to the longitudinal axis A-A of the recess 110. In other embodiments, the heating zone 110 may have a cross section other than circular and/or not be elongate and/or not be cylindrical. In this embodiment, the article 1 and the recess 110 are relatively dimensioned so that the article 1 is a snug fit in the recess 110.

In this embodiment, the core 150 of the magnetic field generator 120 comprises a magnetically permeable first portion 155, a magnetically permeable first arm 151, and a magnetically permeable second arm 152. The first arm 151 extends from a first end 155*a* of the first portion 155 of the core 150, and the second arm 152 extends from a second end 155*b* of the first portion 155 of the core 150. The second end 155*b* of the first portion 155 is opposite from the first end 155*a* of the first portion 155.

In this embodiment, the first and second arms 151, 152 of the core 150 are on opposite sides of the heating zone 110. More specifically, in this embodiment, the first and second arms 151, 152 of the core 150 have respective free ends 151*a*, 152*b* on opposite sides of the heating zone 110. The respective free ends 151*a*, 152*a* of the first and second arms 151, 152 of the core 150 face each other through the heating zone 110. Furthermore, in this embodiment, each of the first and second arms 151, 152 of the core 150 is elongate in a direction parallel to the longitudinal axis A-A of the heating zone 110.

In this embodiment, a cross-sectional shape of each of the first and second arms 151, 152 of the core 150 in a plane normal to the longitudinal axis A-A of the heating zone 110 is substantially L-shaped. In other embodiments, the cross-sectional shape may be other than L-shaped, such as a 45-degree arc or bend. In this embodiment, each of the first and second arms 151, 152 of the core 150 meets the first portion 155 of the core 150 at substantially ninety degrees. In other embodiments, this angle may be other than ninety degrees, such as between 10 and 170 degrees, between 30 and 150 degrees, between 45 degrees and 135 degrees, or between 60 and 120 degrees.

In this embodiment, the coil 140 is wound around the first portion 155 of the core 150. In this embodiment, the coil 140 is wound around neither of the first and second arms 151, 152 of the core 150. In this embodiment, the coil 140 extends generally along an axis that is perpendicular to the longitudinal axis A-A of the heating zone 110. The volume encircled by the coil 140 comprises the first portion 155 of the core 150 and is free of the heating zone 110. That is, the coil 140 does not encircle the heating zone 110. Accordingly, some portions of the coil 140 are located between the first portion 155 of the core 150 and the heating zone 110, and the first portion 155 of the core 150 is located between some other portions of the coil 140 and the heating zone 110.

The apparatus 100 and the article 1 are relatively dimensioned so that, when the article 1 located is in the heating zone 110, as shown in FIG. 2, the varying magnetic field generated by the magnetic field generator 120 penetrates the heater 20 of the article 1. The geometry of the core 150 and the position of the core 150 relative to the heating zone 110, and the article 1 in use, help to direct the magnetic field so as to effect this penetration of the heater 20. This penetration of the heater 20 is indicated in FIG. 2 by the arrows M. The arrows M in FIG. 2 represent one instantaneous magnetic field line of the magnetic field. It can be seen that the magnetic field line follows a path that extends through the first portion 155 of the core 150, through the first arm 151 of the core 150 to the free end 151*a* of the first arm 151, from the free end 151*a* of the first arm 151 to the heater 20, through the heater 20, from the heater 20 to the free end 152*a* of the second arm 152 of the core 150, and through the second arm 152 to the first portion 155 of the core 150. If the varying magnetic field is an alternating magnetic field, the direction of the magnetic field line would reverse repeatedly but still substantially lie on this path.

The closer the free ends 151*a*, 152*a* of the first and second arms 151, 152 are to the heater 20 of the article 1, the greater the proportion of the magnetic field that will be directed through the heater 20. In some embodiments, the free ends 151*a*, 152*a* of the first and second arms 151, 152 of the core 150 may even contact the article 1 when the article 1 is located in the heating zone 110. Moreover, the smaller the surface area of each of the free ends 151*a*, 152*a* of the first and second arms 151, 152, the greater the concentration of the magnetic field passing through them in use. For example, in some embodiments, the free ends 151*a*, 152*a* may be convex, may be edges of respective tapered portions of the first and second arms 151, 152, or may comprise one or more surface features such as ridges or lumps. In some embodiments, the heater 20, or edges thereof, of the article 1 may be suitably shaped to concentrate the magnetic field passing therethrough.

Figure 3:
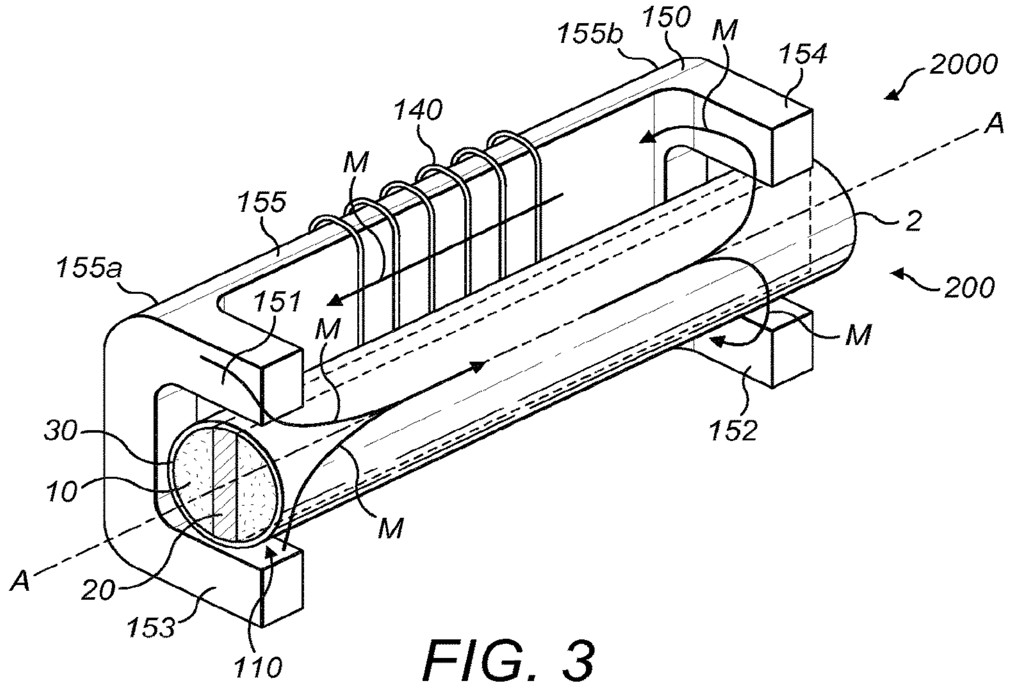
FIG. 3 shows a schematic perspective view of an example of another system, the system comprising an article comprising smokable material, and apparatus for heating the smokable material to volatilize at least one component of the smokable material.

Referring to FIG. 3, there is shown a schematic perspective view of an example of another system according to an embodiment of the present disclosure. The system 2000 comprises an article 2 comprising smokable material 10, and apparatus 200 for heating the smokable material 10 to volatilize at least one component of the smokable material 10. In this embodiment, the apparatus 200 is for heating the smokable material 10 to volatilize at least one component of the smokable material 10 without burning the smokable material 10.

In this embodiment, the article 2 is the same as the article 1 of the system 1000 of FIG. 2, albeit rotated through ninety degrees in FIG. 3, and so will not be described again in detail. Any of the herein-described possible variations to the article 1 of FIG. 2 may be made to the article 2 of FIG. 3 to form separate respective embodiments.

In this embodiment, the apparatus 200 comprises a heating zone 110 for receiving the article 2, and the magnetic field generator 120 shown schematically in FIG. 1. In this embodiment, the heating zone 110 is a recess in the apparatus 200. Moreover, in this embodiment, the heating zone 110 is a recess in the core 150. More specifically, in this embodiment, the recess 110 is elongate and has a longitudinal axis A-A. Furthermore, although not expressly shown in FIG. 3, in this embodiment the recess 110 is cylindrical with a substantially circular cross section in a plane normal to the longitudinal axis A-A of the recess 110. In other embodiments, the heating zone 110 may have a cross section other than circular and/or not be elongate and/or not be cylindrical. In this embodiment, the article 2 and the recess 110 are relatively dimensioned so that the article 2 is a snug fit in the recess 110.

In this embodiment, the core 150 of the magnetic field generator 120 comprises a magnetically permeable first portion 155, a magnetically permeable first arm 151, a magnetically permeable second arm 152, a magnetically permeable third arm 153, and a magnetically permeable fourth arm 154. The first and third arms 151, 153 extend from a first end 155*a* of the first portion 155 of the core 150, and the second and fourth arms 152, 154 extend from a second end 155*b* of the first portion 155 of the core 150. The second end 155*b* of the first portion 155 is opposite from the first end 155*a* of the first portion 155.

In this embodiment, the first and fourth arms 151, 154 of the core 150 are on a first side of the heating zone 110, and the second and third arms 152, 153 are on a second side of the heating zone 110. The first side of the heating zone 110 is opposite to the second side of the heating zone 110. The first arm 151 faces the third arm 153 through the heating zone 110, and the fourth arm 154 faces the second arm 152 through the heating zone 110. Therefore, the first and second arms 151, 152 of the core 150 are on opposite sides of the heating zone 110, and the third and fourth arms 153, 154 of the core 150 are on opposite sides of the heating zone 110. Portions of the heating zone 110 are thus effectively located between the first and third arms 151, 153 and between the second and fourth arms 152, 154. In this embodiment, the first portion 155 of the core 150 is elongate in a direction parallel to the longitudinal axis A-A of the heating zone 110. Furthermore, in this embodiment, each of the first, second, third and fourth arms 151, 152, 153, 154 of the core 150 is elongate in a direction perpendicular to the longitudinal axis A-A of the heating zone 110.

In this embodiment, a cross-sectional shape of the combination of the first and third arms 151, 153 of the core 150 in a plane normal to the longitudinal axis A-A of the heating zone 110 is substantially C-shaped. Similarly, in this embodiment, a cross-sectional shape of the combination of the second and fourth arms 152, 154 of the core 150 perpendicular to the longitudinal axis A-A of the heating zone 110 is substantially C-shaped. In other embodiments, these cross-sectional shapes may be other than C-shaped. In this embodiment, each of the first, second, third and fourth arms 151, 152, 153, 154 of the core 150 meets the first portion 155 of the core 150 at substantially ninety degrees. In other embodiments, this angle may be other than ninety degrees, such as between 10 and 170 degrees, between 30 and 150 degrees, between 45 degrees and 135 degrees, or between 60 and 120 degrees.

In this embodiment, the coil 140 is wound around the first portion 155 of the core 150. In this embodiment, the coil 140 is wound around neither of the first and second arms 151, 152 of the core 150. In this embodiment, the coil 140 extends generally along an axis that is parallel to the longitudinal axis A-A of the heating zone 110. The volume encircled by the coil 140 comprises the first portion 155 of the core 150 and is free of the heating zone 110. That is, the coil 140 does not encircle the heating zone 110. Accordingly, some portions of the coil 140 are located between the first portion 155 of the core 150 and the heating zone 110, and the first portion 155 of the core 150 is located between some other portions of the coil 140 and the heating zone 110.

The apparatus 200 and the article 2 are relatively dimensioned so that, when the article 2 located is in the heating zone 110, as shown in FIG. 3, the varying magnetic field generated by the magnetic field generator 120 penetrates the heater 20 of the article 2. The geometry of the core 150 and the position of the core 150 relative to the heating zone 110, and the article 2 in use, help to direct the magnetic field so as to effect this penetration of the heater 20. This penetration of the heater 20 is indicated in FIG. 3 by the arrows M. The arrows M in FIG. 3 represent a few instantaneous magnetic field lines of the magnetic field. It can be seen that the magnetic field lines follow paths that extend through the first portion 155 of the core 150, through the first or third arm 151, 153 of the core 150 to the heater 20, through the heater 20, from the heater 20 to the second or fourth arm 152, 14 of the core 150, and through the second or fourth arm 152, 154 to the first portion 155 of the core 150. If the varying magnetic field is an alternating magnetic field, the direction of the magnetic field lines would reverse repeatedly but still substantially lie on these paths.

The closer the arms 151, 152, 153, 154 of the core 150 are to the heater 20 of the article 2, the greater the proportion of the magnetic field that will be directed through the heater 20. In some embodiments, some or all of the arms 151, 152, 153, 154 of the core 150 may even contact the article 2 when the article 2 is located in the heating zone 110.

In a variation to the embodiment of FIG. 3, the arms 151, 152, 153, 154 of the core 150 may connect the first portion 155 of the core 150 to a second portion of the core 150. The second portion of the core may be on an opposite side of the heating zone 110 from the first portion 155 of the core 150. That is, the arms 151, 152, 153, 154 may not have respective free ends as illustrated, but instead may all be joined to one another by a portion of the core 150 similar to the first portion 155 of the core 150. The core 150 may be symmetrical about a plane that is parallel to the longitudinal axis of the heating zone 110. In such an embodiment, the first and second portions of the core 150 and the first and third arms 151, 153 of the core 150 would define a first window and the first and second portions of the core 150 and the second and fourth arms 152, 154 of the core 150 would define a second window. The longitudinal axis of the heating zone 110 may extend through one or both of the windows. Moreover, the heating zone 110 would extend through, or be accessible through, each of the windows. The magnetic field generator may comprise a second coil wound around the second portion of the core. In such a construction, a first set of magnetic field lines may follow the paths shown in FIG. 3, and a second set of magnetic field lines may follow paths that extend through the second portion of the core 150 in place of the first portion 155, through the arms 151, 152, 153, 154 and through the heater 20 of the article 2.

Figure 4:
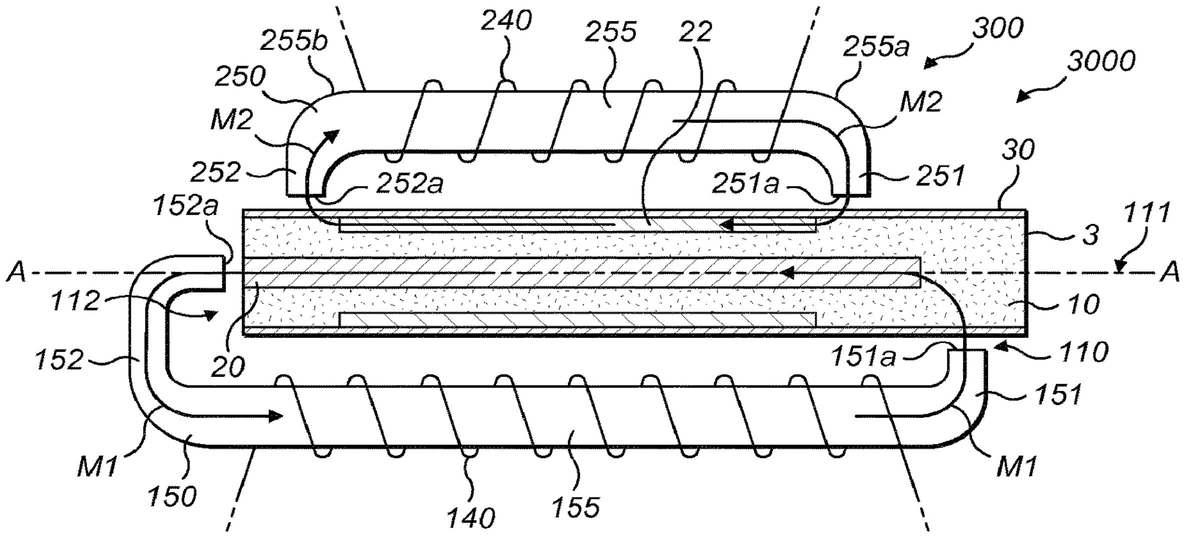
FIG. 4 shows a schematic partial cross-sectional view of an example of another system, the system comprising an article comprising smokable material, and apparatus for heating the smokable material to volatilize at least one component of the smokable material.

Referring to FIG. 4, there is shown a schematic perspective view of an example of another system according to an embodiment of the present disclosure. The system 3000 comprises an article 3 comprising smokable material 10, and apparatus 300 for heating the smokable material 10 to volatilize at least one component of the smokable material 10. In this embodiment, the apparatus 300 is for heating the smokable material 10 to volatilize at least one component of the smokable material 10 without burning the smokable material 10.

In this embodiment, the article 3 of the system 3000 comprises a mass of smokable material 10, a first heater 20, a second heater 22, and a cover 30.

Each of the first and second heaters 20, 22 comprises heating material that is heatable by penetration with a varying magnetic field. In this embodiment, the first heater 20 is in the form of a rod, and the second heater 22 is in the form of a tube that surrounds a portion of the first heater 20. In this embodiment, the first heater 20 is within the smokable material 10, and the second heater 22 surrounds the smokable material 10. Thus, the smokable material 10 is located between the first and second heaters 20, 22. In other embodiments, the first and second heaters 20, 22 may take different forms to those illustrated. However, it is preferred that the first heater 20 is out of contact with the second heater 22, as is the case in this embodiment.

The cover 30 of the article 3 encircles the smokable material 10 and the first and second heaters 20, 22 to help maintain the relative positions of the smokable material 10 and the heaters 20, 22. The cover 30 may be made of any suitable material, such as paper, card, a plastics material, or the like. In other embodiments, the cover 30 may take a different form or be omitted.

In this embodiment, the article 3 is elongate and cylindrical with a substantially circular cross section in a plane normal to a longitudinal axis of the article 3. However, in other embodiments, the article 3 may have a cross section other than circular and/or not be elongate and/or not be cylindrical. The article 3 may have proportions approximating those of a cigarette.

In this embodiment, the apparatus 300 comprises a heating zone 110 for receiving the article 3, and a magnetic field generator. The magnetic field generator comprises all the components of the magnetic field generator 120 shown schematically in FIG. 1, as well as a second magnetically permeable core 250 and a second coil 240 wound around the second core 250, as will be described in more detail below. The device 160 is for passing a varying current through the second coil 240. The device 160 is electrically connected between the electrical power source 130 and the second coil 240. The electrical connection between the device 160 and the second coil 240 may be in parallel or in series to the electrical connection between the device 160 and the first coil 140.

The device 160 may be controllable by the controller 170 to pass a varying electrical current through one of the first and second coils 140, 240 independently of passing a varying electrical current through the other of the first and second coils 140, 240. For example, the controller 170 may cause an electrical current to be passed through the first coil 140 for a first period of time, and to then cause an electrical current to be passed through the second coil 240 for a second period of time. The second period of time may commence on expiry of the first period of time. Such actions may effect progressive heating of the smokable material 10 of the article 3.

In this embodiment, the heating zone 110 is a recess in the apparatus 300. More specifically, in this embodiment, the recess 110 has an open first end 111 through which the article 3 is insertable into the recess 110, a second end 112 opposite the first end 111, and one or more sides connecting the first and second ends 111, 112. The recess 110 is elongate and has a longitudinal axis A-A. Furthermore, although not expressly shown in FIG. 4, in this embodiment the recess 110 is cylindrical with a substantially circular cross section in a plane normal to the longitudinal axis A-A of the recess 110. In other embodiments, the heating zone 110 may have a cross section other than circular and/or not be elongate and/or not be cylindrical. In this embodiment, the article 3 and the recess 110 are relatively dimensioned so that the article 3 is a snug fit in the recess 110.

In this embodiment, the first core 150 of the magnetic field generator 120 comprises a magnetically permeable first portion 155, a magnetically permeable first arm 151, and a magnetically permeable second arm 152. The first arm 151 extends from a first end **155*a* of the first portion 155 of the first core 150, and the second arm 152 extends from a second end 155*b* of the first portion 155 of the first core 150. The second end 155*b* of the first portion 155 is opposite from the first end 155*a* of the first portion 155**.

In this embodiment, the first and second arms 151, 152 of the first core 150 are on different sides of the heating zone 110. More specifically, in this embodiment, the first and second arms 151, 152 of the first core 150 have respective free ends **151*a*, 152*b* on different sides of the heating zone 110. In this embodiment, the first arm 151 of the first core 150 is at the side, or one of the sides, of the recess 110, and the second arm 152 of the first core 150 is at the second end 112 of the recess 110. More specifically, the free end 151*a* of the first arm 151 is at the side, or one of the sides, of the recess 110, and the free end 152*a* of the second arm 152 is at the second end 112 of the recess 110. In this embodiment, the longitudinal axis A-A of the heating zone 110 passes through the free end 152*a* of the second arm 152. The respective free ends 151*a*, 152*a* of the first and second arms 151, 152 of the first core 150 face the heating zone 110. This arrangement helps provide that some magnetic field lines M1 follow a first path that extends from the first core 150 and into the first heater 20, whereas other magnetic field lines M2 follow a second path that extends from the second core 250 and into the second heater 22. That is, by positioning the second arm 152 at the second end 112 of the recess 110, magnetic flux is encouraged to flow from the first core 150 into the first heater 20, rather than into the second heater 22**.

In this embodiment, a cross-sectional shape of the first arm 151 of the first core 150 parallel to the longitudinal axis A-A of the heating zone 110 is substantially L-shaped. In other embodiments, the cross-sectional shape may be other than L-shaped, such as a 45-degree arc or bend. Further, in this embodiment, a cross-sectional shape of the second arm 152 of the first core 150 parallel to the longitudinal axis A-A of the heating zone 110 is substantially C-shaped. In other embodiments, the cross-sectional shape may be other than C-shaped.

In this embodiment, the coil 140 is wound around the first portion 155 of the first core 150. In this embodiment, the coil 140 is wound around neither of the first and second arms 151, 152 of the first core 150. In this embodiment, the coil 140 extends generally along an axis that is parallel to the longitudinal axis A-A of the heating zone 110. The volume encircled by the coil 140 comprises the first portion 155 of the first core 150 and is free of the heating zone 110. That is, the coil 140 does not encircle the heating zone 110. Accordingly, some portions of the coil 140 are located between the first portion 155 of the first core 150 and the heating zone 110, and the first portion 155 of the first core 150 is located between some other portions of the coil 140 and the heating zone 110.

The apparatus 300 and the article 3 are relatively dimensioned so that, when the article 3 is located is in the heating zone 110, as shown in FIG. 4, the varying magnetic field generated by the first coil 140 of the magnetic field generator 120 penetrates the first heater 20 of the article 3. The geometry of the first core 150 and the position of the first core 150 relative to the heating zone 110, and the article 3 in use, help to direct the magnetic field so as to effect this penetration of the first heater 20. This penetration of the first heater 20 is indicated in FIG. 4 by the arrows M1. The arrows M1 in FIG. 4 represent one instantaneous magnetic field line of the magnetic field. It can be seen that the magnetic field line follows a path that extends through the first portion 155 of the first core 150, through the first arm 151 of the first core 150 to the first heater 20, through the first heater 20, from the first heater 20 to the second arm 152 of the first core 150, and through the second arm 152 to the first portion 155 of the first core 150. If the varying magnetic field is an alternating magnetic field, the direction of the magnetic field line would reverse repeatedly but still substantially lie on this path.

The magnetically permeable second core 250 comprises a magnetically permeable first portion 255, a magnetically permeable first arm 251, and a magnetically permeable second arm 252. The first arm 251 extends from a first end **255*a* of the first portion 255 of the second core 250, and the second arm 252 extends from a second end 255*b* of the first portion 255 of the second core 250. The second end 255*b* of the first portion 255 is opposite from the first end 255*a* of the first portion 255**.

In this embodiment, the first and second arms 251, 252 of the second core 250 are on the same side of the heating zone 110. In other embodiments, the first and second arms 251, 252 of the second core 250 may be on different sides of the heating zone 110, such as opposite sides. Moreover, the first and second arms 251, 252 of the second core 250 have respective free ends **251*a*, 252*a* that face the heating zone 110**.

In this embodiment, a cross-sectional shape of each of the first and second arms 251, 252 of the second core 250 parallel to the longitudinal axis A-A of the heating zone 110 is substantially L-shaped. In other embodiments, the cross-sectional shape may be other than L-shaped, such as a 45-degree arc or bend.

In this embodiment, the second coil 240 is wound around the first portion 255 of the second core 250. In this embodiment, the second coil 240 is wound around neither of the first and second arms 251, 252 of the second core 250. In this embodiment, the second coil 240 extends generally along an axis that is parallel to the longitudinal axis A-A of the heating zone 110. The volume encircled by the coil 240 comprises the first portion 255 of the second core 250 and is free of the heating zone 110. That is, the second coil 240 does not encircle the heating zone 110. Accordingly, some portions of the second coil 240 are located between the first portion 255 of the second core 250 and the heating zone 110, and the first portion 255 of the second core 250 is located between some other portions of the second coil 240 and the heating zone 110.

The apparatus 300 and the article 3 are relatively dimensioned so that, when the article 3 is located is in the heating zone 110, as shown in FIG. 4, the varying magnetic field generated by the second coil 240 penetrates the second heater 22 of the article 3. The geometry of the second core 250 and the position of the second core 250 relative to the heating zone 110, and the article 3 in use, help to direct the magnetic field so as to effect this penetration of the second heater 22. This penetration of the second heater 22 is indicated in FIG. 4 by the arrows M2. The arrows M2 in FIG. 4 represent one instantaneous magnetic field line of the magnetic field. It can be seen that the magnetic field line follows a path that extends through the first portion 255 of the second core 250, through the first arm 251 of the second core 250 to the second heater 22, through the second heater 22, from the second heater 22 to the second arm 252 of the second core 250, and through the second arm 252 to the first portion 255 of the second core 250. If the varying magnetic field is an alternating magnetic field, the direction of the magnetic field line would reverse repeatedly but still substantially lie on this path.

The closer the arms 151, 152, 251, 252 of the first and second cores 150, 250 are to the first and second heaters 20, 22 of the article 3, the greater the proportion of the magnetic fields that will be directed through the first and second heaters 20, 22. In some embodiments, some or all of the arms 151, 152, 251, 252 of the cores 150, 250 may even contact the article 3 when the article 3 is located in the heating zone 110. Moreover, the smaller the surface area of each of the free ends 151*a*, 152*a*, 251*a*, 252*a* of the arms 151, 152, 251, 252, the greater the concentration of the magnetic field passing through them in use. The free ends 151*a*, 152*a*, 251*a*, 252*a* may take any of the forms discussed above.

In each of the above-described embodiments, the first portion 155, 255 of the first or second core 150, 250 is unitary or integral with each of the first and second arms 151, 152 of that core 150, 250. However, in some embodiments, the first portion 155, 255 of the first or second core 150 may be non-unitary with, and fastened to, one or both of the first and second arms 151, 152 of that core 150, 250.

In FIGS. 1 to 4, the first and second coils 140, 240 are shown as having only a few windings. However, in reality, each of the first and second coils 140, 240 could comprise tens or hundreds of windings.

In FIGS. 1 to 4, the heating zone 110 is a recess 110. In other embodiments, the heating zone 110 may be other than a recess, such as a shelf, a surface, or a projection, and may require mechanical mating with the article 1, 2, 3 in order to co-operate with the article 1, 2, 3. The recess 110 may be defined by the combination of the core(s) 150, 250 and other, less or non-magnetically permeable material, such as a housing of the apparatus 100, 200, 300. The housing may be made, for example, from a plastics material.

In some embodiments, an impedance of the coil 140, 240 of the magnetic field generator 120 is equal, or substantially equal, to an impedance of the heater 20, 22 in the article 1, 2, 3. If the impedance of the heater 20, 22 of the article 1, 2, 3 were instead lower than the impedance of the coil 140, 240, then the voltage generated across the heater 20, 22 in use may be lower than the voltage that may be generated across the heater 20, 22 when the impedances are matched. Alternatively, if the impedance of the heater 20, 22 of the article 1, 2, 3 were instead higher than the impedance of the coil 140, 240, then the electrical current generated in the heater 20, 22 in use may be lower than the current that may be generated in the heater 20, 22 when the impedances are matched. Matching the impedances may help to balance the voltage and current to maximize the heating power generated by the heater 20, 22 of the article 1, 2, 3 when heated in use.

In each of the embodiments discussed above, the heating material of the heater 20, 22 is aluminum. However, in other embodiments, the heating material may comprise one or more materials selected from the group consisting of: an electrically-conductive material, a magnetic material, and a magnetic electrically-conductive material. In some embodiments, the heating material may comprise a metal or a metal alloy. In some embodiments, the heating material may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. In some embodiments, the heating material may be magnetic. It has also been found that, when magnetic electrically-conductive material is used as the heating material, magnetic coupling between the magnetic electrically-conductive material and an electromagnet of the apparatus in use may be enhanced. In addition to potentially enabling magnetic hysteresis heating, this can result in greater or improved Joule heating of the heating material, and thus greater or improved heating of the smokable material 20.

In each of the articles 1, 2, 3 shown in FIGS. 2 to 4, the heating material of the heater 20, 22 is in contact with the smokable material 10. Thus, when the heating material is heated by penetration with a varying magnetic field, heat may be transferred directly from the heating material to the smokable material 10. In other embodiments, the heating material may be kept out of contact with the smokable material 10. For example, in some embodiments, the article 1, 2, 3 may comprise a thermally-conductive barrier that is free of heating material and that spaces the heating material from the smokable material 10. In some embodiments, the thermally-conductive barrier may be a coating on the heating material. The provision of such a barrier may be advantageous to help to dissipate heat to alleviate hot spots in the heating material.

In each of the embodiments discussed above, the heating material may have a skin depth, which is an exterior zone within which most of an induced electrical current and/or induced reorientation of magnetic dipoles occurs. By providing that the component comprising the heating material has a relatively small thickness, a greater proportion of the heating material may be heatable by a given varying magnetic field, as compared to heating material in a component having a depth or thickness that is relatively large as compared to the other dimensions of the component. Thus, a more efficient use of material is achieved. In turn, costs are reduced.

In some embodiments, a component comprising the heating material may comprise discontinuities or holes therein. Such discontinuities or holes may act as thermal breaks to control the degree to which different regions of the smokable material 10 are heated in use. Areas of the heating material with discontinuities or holes therein may be heated to a lesser extent that areas without discontinuities or holes. This may help progressive heating of the smokable material 10, and thus progressive generation of vapor, to be achieved. Such discontinuities or holes may, on the other hand, be used to optimize the creation of complex eddy currents in use.

In each of the above described embodiments, the smokable material 10 comprises tobacco. However, in respective variations to each of these embodiments, the smokable material 10 may consist of tobacco, may consist substantially entirely of tobacco, may comprise tobacco and smokable material other than tobacco, may comprise smokable material other than tobacco, or may be free of tobacco. In some embodiments, the smokable material 10 may comprise a vapor or aerosol forming agent or a humectant, such as glycerol, propylene glycol, triacetin, or diethylene glycol.

In each of the above described embodiments, the article 1, 2, 3 is a consumable article. Once all, or substantially all, of the volatilizable component(s) of the smokable material 10 in the article 1, 2, 3 has/have been spent, the user may remove the article 1, 2, 3 from the apparatus 100, 200, 300 and dispose of the article 1, 2, 3. The user may subsequently re-use the apparatus 100, 200, 300 with another of the articles 1, 2, 3. However, in other respective embodiments, the article 1, 2, 3 may be non-consumable, and the apparatus 100, 200, 300 and the article 1, 2, 3 may be disposed of together once the volatilizable component(s) of the smokable material 20 has/have been spent.

In some embodiments, the apparatus 100, 200, 300 is sold, supplied or otherwise provided separately from the articles 1, 2, 3 with which the apparatus 100, 200, 300 is usable. However, in some embodiments, the apparatus 100, 200, 300 and one or more of the articles 1, 2, 3 may be provided together as a system 1000, 2000, 3000, such as a kit or an assembly, possibly with additional components, such as cleaning utensils.

In some embodiments, the apparatus 100, 200, 300 may comprise a heater comprising heating material that is heatable by penetration with a varying magnetic field. The core(s) may be shaped so as to encourage the flow of magnetic flux through the heater of the apparatus 100, 200, 300. Such a heater of the apparatus 100, 200, 300 may, for example, comprise a tubular heater that defines the heating zone 110. In some such embodiments, the article 1, 2, 3 may be free of heating material, and the smokable material may be heated by heat transferred from the heater of the apparatus 100, 200, 300.

Embodiments of the disclosure could be implemented in a system comprising any one of the articles discussed herein, and any one of the apparatuses discussed herein, wherein the apparatus itself has heating material, such as in a susceptor, for heating by penetration with the varying magnetic field generated by the magnetic field generator. Heat generated in the heating material of the apparatus could be transferred to the article to heat, or further heat, the smokable material therein when the article is in the heating zone.

In order to address various issues and advance the art, the entirety of this disclosure shows by way of illustration and example various embodiments in which the claimed invention may be practiced and which provide for superior apparatus for heating smokable material to volatilize at least one component of the smokable material, and superior systems comprising such apparatus and articles for use with such apparatus. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An apparatus for heating smokable material to volatilize at least one component of the smokable material, the apparatus comprising:

a heating zone configured to receive an article, the article comprising smokable material and heating material that is heatable by penetration with a varying magnetic field to heat the smokable material; and a magnetic field generator for generating a varying magnetic field that penetrates the heating zone, the magnetic field generator comprising a magnetically permeable first core and a first coil, and a magnetically permeable second core and a second coil;

wherein the first core comprises a magnetically permeable first portion, wherein the first coil is wound around the first portion of the core;

wherein the second core comprises a magnetically permeable first portion, wherein the second coil is wound around the first portion of the second core;

wherein the heating zone is a recess in at least one of the first core or the second core.

2. The apparatus of claim 1, wherein the heating zone is elongate.

3. The apparatus of claim 1, wherein the first coil and the second coil comprise a same number of windings.

4. The apparatus of claim 1, wherein the first coil comprises a different number of windings to the second coil.

5. The apparatus of claim 1, wherein the first core and/or the second core comprises ferrite.

6. The apparatus of claim 1, wherein the heating zone is in the form of a shelf, a surface or a projection.

7. The apparatus of claim 1, wherein the heating zone is configurable to be mechanically mated to the article.

8. A system, comprising:

an article comprising smokable material and a first heater, wherein the first heater comprises heating material that is heatable by penetration with a varying magnetic field to heat the smokable material; and an apparatus for heating the smokable material to volatilize at least one component of the smokable material, the apparatus comprising:

a heating zone configured to receive the article; and a magnetic field generator for generating a varying magnetic field that penetrates the heater when the article is in the heating zone, the magnetic field generator comprising a magnetically permeable first core and a first coil, and a magnetically permeable second core and a second coil;

wherein the first core comprises a magnetically permeable first portion, wherein the first coil is wound around the first portion of the core;

wherein the second core comprises a magnetically permeable first portion, wherein the second coil is wound around the first portion of the second core; and wherein the heating zone is a recess in at least one of the first core or the second core.

9. The system of claim 8, wherein the heating zone is elongate.

10. The system of claim 8, wherein the first coil and the second coil comprise a same number of windings.

11. The system of claim 8, wherein the first coil comprises a different number of windings to the second coil.

12. The system of claim 8, wherein the first core and/or the second core comprises ferrite.

13. The system of claim 8, wherein the heating zone is the form of a shelf, a surface or a projection.

14. The system of claim 8, wherein the heating zone is configurable to be mechanically mated to the article.

15. The system of claim 8, wherein the article comprises a second heater comprising heating material that is heatable by penetration with a varying magnetic field to heat the smokable material.

16. The system of claim 15, wherein the smokable material of the article is located between the first heater and the second heater.

17. The system of claim of claim 15, wherein the first heater is in the form of a rod.

18. The system of claim 15, wherein the second heater is in the form of a tube.

19. The system of claim 18, wherein the second heater surrounds a portion of the first heater.

20. The system of claim 15, wherein the first heater is disposed within the smokable material, and wherein the second heater surrounds the smokable material.

21. The system of claim 8, wherein the smokable material comprises tobacco and/or one or more humectants.

22. The system of claim 8, wherein the heating material comprises one or more materials selected from the group consisting of: an electrically-conductive material, a magnetic material, and a magnetic electrically-conductive material.

23. The system of claim 8, wherein the heating material comprises a metal or a metal alloy.

* * * * *